US010084962B2

(12) United States Patent
Kokaram et al.

(10) Patent No.: US 10,084,962 B2
(45) Date of Patent: Sep. 25, 2018

(54) SPHERICAL VIDEO STABILIZATION BASED ON ACCELEROMETER DATA

(71) Applicant: Google Inc., Mountain View, CA (US)

(72) Inventors: Anil Christopher Kokaram, Sunnyvale, CA (US); Husain Bengali, Redmond, WA (US); Neil Aylon Charles Birkbeck, Mountain View, CA (US); Sasi Inguva, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/353,488

(22) Filed: Nov. 16, 2016

(65) Prior Publication Data

US 2017/0142337 A1      May 18, 2017

Related U.S. Application Data

(60) Provisional application No. 62/255,788, filed on Nov. 16, 2015.

(51) Int. Cl.
*H04N 5/232*      (2006.01)

(52) U.S. Cl.
CPC ..... *H04N 5/23267* (2013.01); *H04N 5/23238* (2013.01); *H04N 5/23254* (2013.01); *H04N 5/23258* (2013.01); *H04N 5/23261* (2013.01); *H04N 5/23277* (2013.01)

(58) Field of Classification Search
CPC ........... H04N 5/23267; H04N 5/23277; H04N 5/23254; H04N 5/23258; H04N 5/23261; H04N 5/23238
See application file for complete search history.

(56) References Cited

U.S. PATENT DOCUMENTS

| 5,629,988 | A  | 5/1997  | Burt et al. |
| 6,130,709 | A  | 10/2000 | Sekine et al. |
| 6,560,375 | B1 | 5/2003  | Hathaway et al. |
| 6,788,333 | B1 | 9/2004  | Uyttendaele et al. |
| 7,558,405 | B2 | 7/2009  | Tico et al. |
| 8,385,732 | B2 | 2/2013  | Zuniga et al. |
| 8,442,108 | B2 | 5/2013  | Song et al. |
| 8,487,981 | B2 | 7/2013  | Hulyalkar et al. |

(Continued)

FOREIGN PATENT DOCUMENTS

| CN | 101231456 A  | 7/2008 |
| CN | 101316368 A  | 12/2008 |
| WO | 2017087537 A1 | 5/2017 |

OTHER PUBLICATIONS

Kamali, et al., "Stabilizing Omnidirectional Videos Using 3D Structure and Spherical Image Warping", MVA2011 IAPR Conference on Machine Vision Applications, Jun. 13-15, 2011, 4 pages.

(Continued)

*Primary Examiner* — Shahbaz Nazrul
(74) *Attorney, Agent, or Firm* — Brake Hughes Bellermann LLP

(57) ABSTRACT

A method includes identifying a frame of a spherical video as a key frame, storing a compensation component based on position data of a camera in association with the key frame, and compensating for a movement of the camera in a subsequent frame of the spherical video based on the key frame and the compensation component associated with the key frame.

20 Claims, 10 Drawing Sheets

(56) References Cited

U.S. PATENT DOCUMENTS

| | | |
|---|---|---|
| 8,531,504 B2 | 9/2013 | Nestares et al. |
| 8,531,535 B2 | 9/2013 | Kwatra et al. |
| 8,638,395 B2 | 1/2014 | Schoenblum et al. |
| 8,698,874 B2 | 4/2014 | Watson et al. |
| 8,723,966 B2 | 5/2014 | Owen et al. |
| 8,760,513 B2 | 6/2014 | Strine et al. |
| 8,810,666 B2 | 8/2014 | Grundmann et al. |
| 8,872,928 B2 | 10/2014 | Jin et al. |
| 8,896,713 B2 | 11/2014 | Corey et al. |
| 9,858,655 B2 * | 1/2018 | Jiang ................... G06T 5/50 |
| 2005/0213840 A1 | 9/2005 | Chen et al. |
| 2007/0036460 A1 | 2/2007 | Koch et al. |
| 2007/0236578 A1 * | 10/2007 | Nagaraj ............ H04N 5/23248 348/208.99 |
| 2009/0256918 A1 * | 10/2009 | Rabinowitz .......... G02B 27/646 348/208.4 |
| 2009/0309984 A1 | 12/2009 | Bourgain et al. |
| 2010/0053347 A1 * | 3/2010 | Agarwala .......... H04N 5/23248 348/208.99 |
| 2011/0149016 A1 | 6/2011 | Kimura et al. |
| 2011/0176014 A1 * | 7/2011 | Hong ..................... H04N 5/145 348/208.4 |
| 2012/0113235 A1 | 5/2012 | Shintani et al. |
| 2012/0120264 A1 * | 5/2012 | Lee ......................... G06T 7/20 348/208.4 |
| 2013/0027775 A1 | 1/2013 | Zuniga et al. |
| 2013/0093906 A1 | 4/2013 | Carlsson et al. |
| 2013/0342714 A1 * | 12/2013 | Zhou .................. H04N 5/23258 348/208.2 |
| 2014/0002681 A1 | 1/2014 | Campbell et al. |
| 2014/0198852 A1 | 7/2014 | Incesu et al. |
| 2014/0226070 A1 | 8/2014 | Zheng et al. |
| 2014/0293004 A1 * | 10/2014 | Tsubaki ............. H04N 5/23287 348/43 |
| 2015/0002686 A1 | 1/2015 | Karpenko |

OTHER PUBLICATIONS

Kopf, "360 video stabilization: A new algorithm for smoother 360 video viewing", retrieved on Oct. 20, 2016 from https://code.facebook.com/posts/697469023742261/360videostabilizationanewalgorithmforsmoother360videoviewing/, 12 pages.

International Search Report and Written Opinion for PCT Application No. PCT/US2016/62301, dated Jan. 25, 2017, 12 pages.

* cited by examiner

SPHERICAL VIDEO STABILIZATION BASED ON ACCELEROMETER DATA

CROSS-REFERENCE TO RELATED APPLICATIONS

This application is a Nonprovisional of, and claims priority to, U.S. Provisional Patent Application No. 62/255,788, filed on Nov. 16, 2015, entitled "STABILIZATION BASED ON ACCELEROMETER DATA", the disclosure of which is incorporated by reference herein in its entirety.

FIELD

Embodiments relate to correcting for camera movement during spherical image and/or video capture.

BACKGROUND

When capturing images and/or video, the image capture device (e.g., camera, cell phone, and the like) can move causing undesirable movement, unintended movement and/or image capture distortions. Accordingly, correcting for (e.g., stabilization) while capturing, while storing and/or while processing captured images can be desirable.

SUMMARY

Example embodiments describe systems and methods to compensate for camera movement in captured video, video frames or images.

In a general aspect, a method includes identifying a frame of a spherical video as a key frame, storing a compensation component based on position data of a camera in association with the key frame, and compensating for a movement of the camera in a subsequent frame of the spherical video based on the key frame and the compensation component associated with the key frame.

In another general aspect, a device includes a processor and a memory. The memory is configured to store instructions that when executed by the processor cause the device to identify a frame of a spherical video as a key frame, store a compensation component based on position data in association with the key frame, and compensate for a camera movement in a subsequent frame of the spherical video based on the key frame and the compensation component associated with the key frame.

In yet another general aspect, a non-transitory computer readable medium includes code segments stored thereon. The code segments, when executed by a processor cause the processor to identify a frame of a spherical video as a key frame, store a compensation component based on position data in association with the key frame, and compensate for a camera movement in a subsequent frame of the spherical video based on the key frame and the compensation component associated with the key frame.

Implementations can include one or more of the following features. For example, the method or steps can further include capturing accelerometer data for the camera with each captured frame of the spherical video, using the accelerometer data to generate at least one of a center position, a translation position and a rotation position associated with the key frame, and storing the at least one of the center position, the translation position and the rotation position associated with the key frame, wherein the compensation component is based on the at least one of the center position, the translation position and the rotation position. The method or steps can further include matching a portion of the subsequent frame to a plurality of portions of the key frame, selecting one of the plurality of portions of the key frame for use in the compensating for the movement of the camera based on a direction of the compensation component, and compensating for the movement of the camera in the subsequent frame using the selected one of the plurality of portions of the key frame.

For example, the key frame can be one of a plurality of key frames, and the compensation component associated with the key frame is further based on a previous key frame of the plurality of key frames. The compensating for the camera movement can be performed by one of a camera, a server configured to stream the spherical video and a device configured to render the spherical video. The compensation component can include a center position and a translation position associated with the key frame, and the compensating for the camera movement includes centering the subsequent frame based on the key frame center position and the key frame translation position.

The subsequent frame of the spherical video can be stored as three dimensional (3D) data, the compensation component can include a center position and a translation position associated with the key frame, and the compensating for the camera movement can include rotating the subsequent frame in 3D based on the key frame center position and the key frame translation position. The subsequent frame of the spherical video can be stored as two dimensional (2D) data, the compensation component can include a center position and a translation position associated with the key frame, and the compensating for the camera movement can include shifting the subsequent frame in 2D based on the key frame center position and the key frame translation position and the method or steps can further include correcting for border image loss. For example, the subsequent frame of the spherical video can be stored as two dimensional (2D) data, the compensation component can include a center position and a translation position associated with the key frame, the compensating for the camera movement can include shifting the subsequent frame in 2D based on the key frame center position and the key frame translation position. The method or steps can further include determining whether the spherical video was captured as partial spherical data, upon determining the spherical video was captured as partial spherical data, set pixels of the movement compensated subsequent frame outside a display region of the device to a default value, upon determining the spherical video was not captured as partial spherical data, correcting for border image loss.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
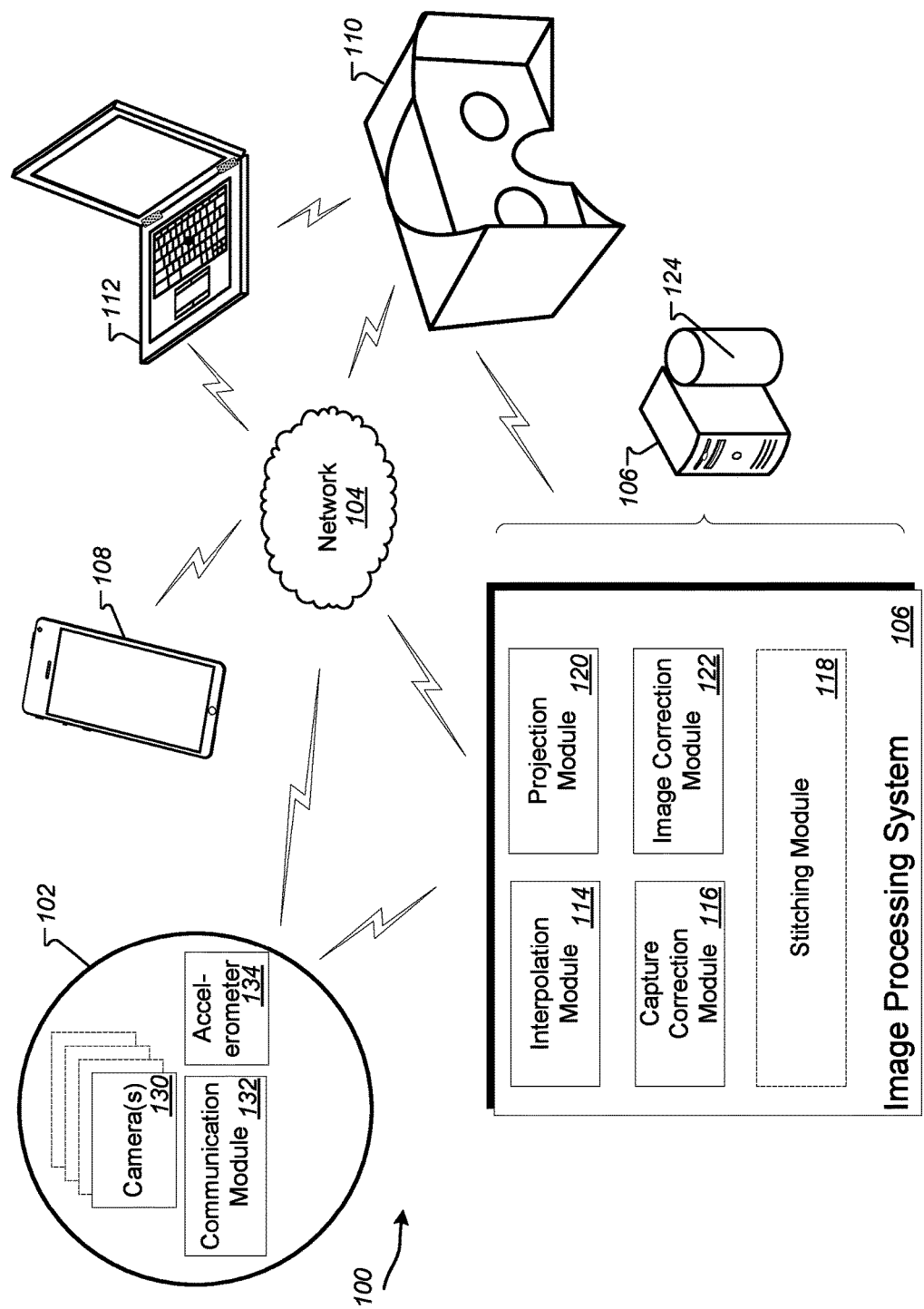
FIG. 1 illustrates a block diagram of a system for capturing and rendering an image and/or video according to at least one example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

An accelerometer can be configured to generate an electrical signal in response to and/or representing acceleration (or deceleration) that is applied along (or parallel with) a sensitive axis. The sensitive axis of the accelerometer can be an x-axis, a y-axis, a z-axis or any combination thereof. For example, a camera rig could include three accelerometers (e.g., one to measure movement along each axis) or one accelerometer that can measure movement along all three axis. Therefore, an accelerometer can generate movement or position information for all three axis. The movement or position information can include translational (e.g., movement along an axis) and rotational (e.g., movement around one or more axis)

An accelerometer measures movement, changes in movement and/or changes in position. Therefore, as applies to accelerometer measurements, acceleration can be (1) constant, (2) transient, or (3) periodic. Constant (or no change in movement) acceleration does not change during an event. For example, a device (e.g., camera rig 100) can be rotating at a constant rotational speed or velocity. As such the device is moving. However, should some event occur that does not cause the rotational speed or velocity to change, an accelerometer would indicate the acceleration as constant (e.g., no change therein).

Transient acceleration is acceleration that varies over the duration of an event, but is not repetitive. Transient acceleration can be the result of discontinuous motion or one time event. For example, transient acceleration can include the deceleration that an airplane undergoes during a landing, the acceleration effects experienced by a skier as she negotiates moguls, a jump, the acceleration effects experienced by a car that goes over a bump in the road and/or the like. In other words, transient acceleration can be movement of the device due to a one time event.

Periodic acceleration is acceleration that varies over the duration of an event or time period, and is repetitive or somewhat repetitive. Periodic acceleration can be the result of continuous motion. For example, periodic acceleration can include vibration associated with machinery or the acceleration experienced by a free-swinging device (e.g., camera rig 100). In other words, periodic acceleration can be movement of the device due to a repetitive event causing a same (or substantially same) amount of movement.

According to example embodiments, at least one of the constant, transient and/or periodic movement can be determined during the capture of spherical image and/or video data. Then, the spherical image and/or video data can be corrected based on the determined acceleration. In other words, the image capture device can include a device (e.g., accelerometer) that measures a movement (e.g., unintended movement) of an image capture device. A captured spherical image and/or video can be stabilized by using the measured movement.

FIG. 1 is a block diagram of an example system 100 for capturing and rendering stereoscopic panoramas in a 3D virtual reality (VR) environment. In the example system 100, a camera rig 102 can capture and provide images over a network 104, or alternatively, can provide the images directly to an image processing system 106 for analysis and processing. In some implementations of system 100, a mobile device 108 can function as the camera rig 102 to provide images throughout network 104. Once the images are captured, the image processing system 106 can perform a number of calculations and processes on the images and provide the processed images to a head mounted display (HMD) device 110 for rendering over network 104, for example. In some implementations, the image processing system 106 can also provide the processed images to mobile device 108 and/or to computing device 112 for rendering, storage, or further processing.

The HMD device 110 may represent a virtual reality headset, glasses, eyepiece, or other wearable device capable of displaying virtual reality content. In operation, the HMD device 110 can execute a VR application (not shown) which can playback received and/or processed images to a user. In some implementations, the VR application can be hosted by one or more of the devices 106, 108, or 112, shown in FIG. 1. In one example, the HMD device 110 can provide a video playback of a scene captured by camera rig 102. In another example, the HMD device 110 can provide playback of still images stitched into a single panoramic scene.

The camera rig 102 can be configured for use as a camera (also can be referred to as a capture device) and/or processing device to gather image data for rendering content in a VR environment. Although camera rig 102 is shown as a block diagram described with particular functionality herein, camera rig 102 can take the form of any of the implementations shown in FIGS. 1-3 and additionally may have functionality described for the camera rigs throughout this disclosure. For example, for simplicity in describing the functionality of system 100, FIG. 1 shows the camera rig 102 without cameras disposed around the rig to capture images. Other implementations of camera rig 102 can include any number of cameras that can be disposed around the circumference of a circular camera rig, such as rig 102.

As shown in FIG. 1, the camera rig 102 includes a number of cameras 130, a communication system 132 and an accelerometer 134. The cameras 130 can include a single still camera or single video camera. In some implementations, the cameras 130 can include multiple still cameras or multiple video cameras disposed (e.g., seated) side-by-side along the outer periphery (e.g., ring) of the camera rig 102. The cameras 130 may be a video camera(s), an image sensor(s), a stereoscopic camera(s), an infrared camera(s), a mobile device and/or the like. The communication system 132 can be used to upload and download images, instructions, and/or other camera related content. The communication may be wired or wireless and can interface over a private or public network.

The accelerometer 134 can be configured to capture position information of the camera rig 102 on the x-y-z axis. As discussed throughout this disclosure, cameras can undergo unintended movement during image capture. Accordingly camera rig 102 can undergo unintended movement during image capture. Accelerometer 134 can be used to capture rotational and translational movement information of the camera rig 102 during the image capture so that the unintended movement can be compensated for (e.g., the image can be stabilized).

The camera rig 102 can be configured to function as stationary rig or a rotational rig. Each camera on the rig is disposed (e.g., placed) offset from a center of rotation for the rig. The camera rig 102 can be configured to rotate around 360 degrees to sweep and capture a, all or a portion of a 360-degree view of a scene, for example. In some implementations, the rig 102 can be configured to operate in a stationary position and in such a configuration, additional cameras can be added to the rig to capture additional outward angles of view for a scene.

In some implementations, the camera rig 102 includes multiple digital video cameras that are disposed in a side-to-side or back-to-back fashion (e.g., shown in FIG. 3, with respect to camera 302B and 302F) such that their lenses each point in a radially outward direction to view a different portion of the surrounding scene or environment. In some implementations, the multiple digital video cameras are disposed in a tangential configuration with a viewing direction tangent to the circular camera rig 102. For example, the camera rig 102 can include multiple digital video cameras that are disposed such that their lenses each point in a radially outward direction while being arranged tangentially to a base of the rig. The digital video cameras can be pointed to capture content in different directions to view different angled portions of the surrounding scene.

In some implementations, the cameras are disposed in stereo pairs on the camera rig 102. In such a configuration, each first camera in each stereo pair is disposed (e.g., placed) tangentially to a circular path of the camera rig base and aligned (e.g., with the camera lens pointing) in a leftward direction. Each second camera in each stereo pair is disposed (e.g., placed) tangentially to the circular path of the camera rig base and aligned (e.g., with the camera lens) pointing in a rightward direction.

Example settings for the cameras used on the camera rig 102 can include a progressive scan mode at about 60 frames per second (i.e., a mode in which each raster line is sampled to produce each frame of the video, rather than every other line as is the standard recording mode of most video cameras). In addition, each of the cameras can be configured with identical (or similar) settings. Configuring each camera to identical (or similar) settings can provide the advantage of capturing images that can be stitched together in a desirable fashion after capture. Example settings can include setting one or more of the cameras to the same zoom, focus, exposure, and shutter speed, as well as setting the cameras to be white balanced with stabilization features either correlated or turned off.

In some implementations, the camera rig 102 can be calibrated prior to being used to capture one or more images or video. For example, each camera on the camera rig 102 can be calibrated and/or configured to take a panoramic video. The settings may include configuring the rig to operate at a particular rotational speed around a 360-degree sweep, with a wide field of view, and in a clockwise or counterclockwise direction, for example. In some implementations, the cameras on rig 102 can be configured to capture, for example, one frame per degree of a 360-degree sweep of a capture path around a scene. In some implementations, the cameras on rig 102 can be configured to capture, for example, multiple frames per degree of a 360-degree (or less) sweep of a capture path around a scene. In some implementations, the cameras on rig 102 can be configured to capture, for example, multiple frames around a sweep of a capture path around a scene without having to capture particularly measured frames per degree.

In some implementations, the cameras can be configured (e.g., set up) to function synchronously to capture video from the cameras on the camera rig at a specific point in time. In some implementations, the cameras can be configured to function synchronously to capture particular portions of video from one or more of the cameras over a time period. Another example of calibrating the camera rig can include configuring how incoming images are stored. For example, incoming images can be stored as individual frames or video (e.g., .avi files, .mpg files) and such stored images can be uploaded to the Internet, another server or device, or stored locally with each camera on the camera rig 102. In some implementations, incoming images can be stored as encoded video.

The image processing system 106 includes an interpolation module 114, a capture correction module 116, a stitching module 118 and memory 124. The interpolation module 114 represents algorithms that can be used to sample portions of digital images and video and determine a number of interpolated images that are likely to occur between adjacent images captured from the camera rig 102, for example. In some implementations, the interpolation module 114 can be configured to determine interpolated image-fragments, image-portions, and/or vertical or horizontal image-strips between adjacent images. In some implementations, the interpolation module 114 can be configured to determine flow fields (and/or flow vectors) between related pixels in adjacent images. Flow fields can be used to compensate for both transformations that images have undergone and for processing images that have undergone transformations. For example, flow fields can be used to compensate for a transformation of a particular pixel grid of an obtained image. In some implementations, the interpolation module 114 can generate, by interpolation of surrounding images, one or more images that are not part of the captured images, and can interleave the generated images into the captured images to generate additional virtual reality content for a scene.

The capture correction module 116 can be configured to correct captured images by compensating for a non-ideal capture setup. Example capture setups can include, by way of non-limiting example, a circular camera trajectory, a parallel principal (camera) axis, a viewing-direction that is perpendicular to the camera trajectory, a viewing direction that is tangential to the camera trajectory and/or other capture conditions. In some implementations, the capture correction module 116 can be configured to compensate for one or both of a non-circular camera trajectory during image capture and/or a non-parallel principal axis during image capture.

The capture correction module 116 can be configured to adjust a particular set of images to compensate for content captured using multiple cameras in which camera separation is larger than about 30 degrees. For example, if the distance between cameras is 40 degrees, the capture correction module 116 can account for any missing content in a particular scene based on too little camera coverage by collecting content from additional cameras or by interpolating the missing content.

In some implementations, the capture correction module 116 can also be configured to adjust the set of images to compensate for camera misalignment due to camera pose errors and the like. For example, if camera pose errors (e.g. errors due to orientation and position of camera) occur during image capture, module 116 can blend two or more columns of pixels from several image frames to remove artifacts including artifacts due to poor exposure (or exposure changes from image frame to image frame) and/or due to misalignment of one or more cameras. The stitching module 118 can be configured to generate 3D stereoscopic images based on defined, obtained, and/or interpolated images. The stitching module 118 can be configured to blend/stitch pixels and/or image-strips from multiple image portions. Stitching can be based on flow fields as determined by the interpolation module 114, for example. For example, the stitching module 118 can receive (from interpolation module 114) interpolated image frames that are not part of the set of images and interleave the image frames into the set of images. The interleaving can include the module 118 stitching together the image frames and the set of images based at least in part on the optical flow generated by the interpolation module 114. The stitched combination can be used to generate an omnistereo panorama for display in a VR head mounted display. The image frames may be based on captured video streams collected from a number of stereo pairs of cameras disposed on a particular rig. Such a rig may include about 6 to about 8 stereo pairs of cameras. Other combinations of such a rig can include 12-16 non-paired cameras, for example. In some implementations, the rig may include one or two stereo pairs of cameras. In some implementations, the rig may include as many stereo pairs of cameras that can be seated side-by-side on the rig. In some implementations, the stitching module 118 can use pose information associated, with at least one stereo pair, to pre-stitch a portion of the set of images before performing the interleaving.

In some implementations of the image processing system 106, the stitching module 118 may be an optional component. For example, when images are capturing in an accurate sweeping motion over 360 degrees without error, stitching the images together may not be necessary to obtain a 3D stereoscopic panorama of a scene.

The image processing system 106 also includes a projection module 120 and an image correction module 122. The projection module 120 can be configured to generate 3D stereoscopic images by projecting images into a planar perspective plane. For example, the projection module 120 can obtain a projection of particular set of images and can configure a re-projection of a portion of the set of images by converting some of the images from a planar perspective projection into a spherical (i.e., equirectangular) perspective projection. The conversions include projection modeling techniques.

Projection modeling can include defining a center of projection and a projection plane. In the examples described in this disclosure, the center of projection can represent an optical center at an origin (0,0,0) of a predefined xyz-coordinate system. The projection plane can be placed in front of the center of projection with a camera facing to capture images along a z-axis in the xyz-coordinate system. In general, a projection can be computed using the intersection of the planar perspective plane of a particular image ray from a coordinate (x, y, z) to the center of projection. Conversions of the projection can be made by manipulating the coordinate systems using matrix calculations, for example.

Projection modeling for stereoscopic panoramas generally includes using multi-perspective images that do not have a single center of projection. The multi-perspective is typically shown as a circular shape (e.g., spherical). Rendering can use the sphere as an approximation when converting from one coordinate system to another.

In general, a spherical (e.g., equirectangular) projection provides a plane that is rectangular with the poles of the sphere mapped to the top and bottom rows of this particular projection, and the equator mapped to the row which bisects the rectangle vertically. A perspective projection provides a view that provides images of 3D objects on a planar (e.g., 2D surface) perspective plane to approximate a user's actual visual perception. In general, images can be rendered on flat image planes (e.g., computer monitor, mobile device LCD screen), so the projection is shown in planar perspective in order to provide an undistorted view. However, planar projection does not allow for 360 degree fields of view, so captured images (e.g., video) can be stored in equirectangular (i.e., spherical) perspective and can be re-projected to planar perspective at render time.

After particular re-projections are completed, the projection module 120 can transmit re-projected portions of images for rendering in an HMD. For example, the projection module 120 can provide portions of a re-projection to a left eye display in HMD 110 and portions of the re-projections to a right eye display in HMD 110. In some implementations, the projection module 120 can be configured to calculate and reduce vertical parallax by re-projecting from a planar perspective projection into a spherical perspective projection.

The image correction module 122 can be configured to generate 3D stereoscopic images by compensating for distortion, including, but not limited to, perspective distortion. In some implementations, the image correction module 122 can determine a particular distance in which optical flow is maintained for 3D stereo and can segment the images to show only portions of a scene in which such flow is maintained. For example, the image correction module 122 can determine that the optical flow of 3D stereo images is maintained between about one radial meter from an outward edge of circular camera rig 102, for example, to about five radial meters from the outward edge of the camera rig 102. Accordingly, the image correction module 122 can ensure that the swatch between one meter and five meters is selected for rendering in the HMD 110 in a projection that is free from distortion while also providing proper 3D stereo effects are proper parallax to a user of the HMD 110.

In some implementations, the image correction module 122 can estimate optical flow by adjusting particular images. The adjustments can include, for example, rectifying a portion of images, determining an estimated camera pose associated with the portion of images, and determining a flow between images in the portion. In a non-limiting example, the image correction module 122 can compensate for a difference in rotation between two particular images in which flow is being computed. This correction can function to remove the flow component caused by a rotation difference (i.e., rotation flow). Such correction results in flow caused by translation (e.g., parallax flow), which can reduce the complexity of flow estimation calculations while making the resulting images accurate and robust. In some implementations, processes in addition to image correction can be performed on the images before rendering. For example, stitching, blending, or additional corrective processes can be performed on the images before rendering is carried out.

In some implementations, the image correction module 122 can correct for projection distortion caused by image content captured with camera geometries that are not based on planar perspective projections. For example, corrections can be applied to the images by interpolating images from a number of different viewing angles and by conditioning viewing rays associated with the images as originating from a common origin. The interpolated images can be interleaved into captured images to produce virtual content that appears accurate to the human eye with a comfortable level of rotational parallax for the human eye.

In the example system 100, the devices 106, 108, and 112 may be a laptop computer, a desktop computer, a mobile computing device, or a gaming console. In some implementations, the devices 106, 108, and 112 can be a mobile computing device that can be disposed (e.g., placed/located) within the HMD device 110. The mobile computing device can include a display device that can be used as the screen for the HMD device 110, for example. Devices 106, 108, and 112 can include hardware and/or software for executing a VR application. In addition, devices 106, 108, and 112 can include hardware and/or software that can recognize, monitor, and track 3D movement of the HMD device 110, when these devices are placed in front of or held within a range of positions relative to the HMD device 110. In some implementations, devices 106, 108, and 112 can provide additional content to HMD device 110 over network 104. In some implementations, devices 102, 106, 108, 110, and 112 can be connected to/interfaced with one or more of each other either paired or connected through network 104. The connection can be wired or wireless. The network 104 can be a public communications network or a private communications network.

In a HMD (e.g., HMD device 110), a viewer experiences a visual virtual reality through the use of a left (e.g., left eye) display and a right (e.g., right eye) display that projects a perceived three-dimensional (3D) video or image. According to example embodiments, a spherical (e.g., 3D) video or image is stored on a server. The video or image can be encoded and streamed to the HMD from the server. The spherical video or image can be encoded as a left image and a right image which packaged (e.g., in a data packet) together with metadata about the left image and the right image. The left image and the right image are then decoded and displayed by the left (e.g., left eye) display and the right (e.g., right eye) display.

The system(s) and method(s) described herein are applicable to both the left image and the right image and are referred to throughout this disclosure as an image, frame, a portion of an image, a portion of a frame, a tile and/or the like depending on the use case. In other words, the encoded data that is communicated from a server (e.g., streaming server) to a user device (e.g., a HMD) and then decoded for display can be a left image and/or a right image associated with a 3D video or image.

The system 100 may include electronic storage. The electronic storage can include non-transitory storage media that electronically stores information. The electronic storage may be configured to store captured images, obtained images, pre-processed images, post-processed images, etc. Images captured with any of the disclosed camera rigs can be processed and stored as one or more streams of video, or stored as individual frames. In some implementations, storage can occur during capture and rendering can occur directly after portions of capture to enable faster access to panoramic stereo content earlier than if capture and processing were concurrent.

Figure 2:
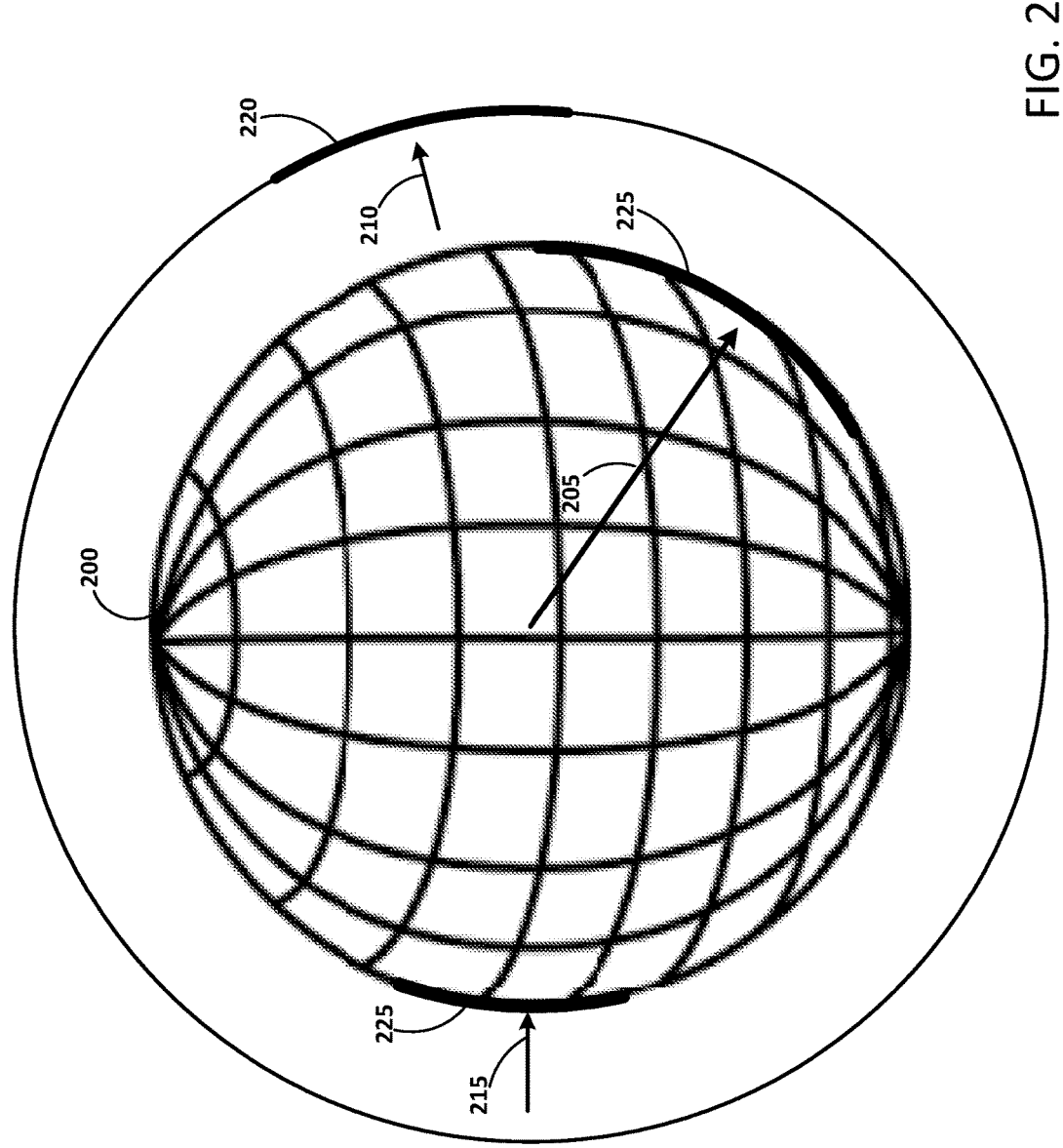
FIG. 2 illustrates a two dimensional (2D) representation of a sphere.

FIG. 2 is a two dimensional (2D) representation of a sphere. As shown in FIG. 2, the sphere 200 (e.g., as a spherical image or frame of a spherical video) illustrates a direction of inside perspectives 205, 210, outside perspective 215 and viewable perspectives 220 and 225. The viewable perspective 220 may be a portion of a spherical 200 (e.g., as a spherical image or frame of a spherical video) as viewed from inside perspective 210. The viewable perspective 225 may be a portion of the sphere 200 as viewed from outside perspective 215.

Figure 3:
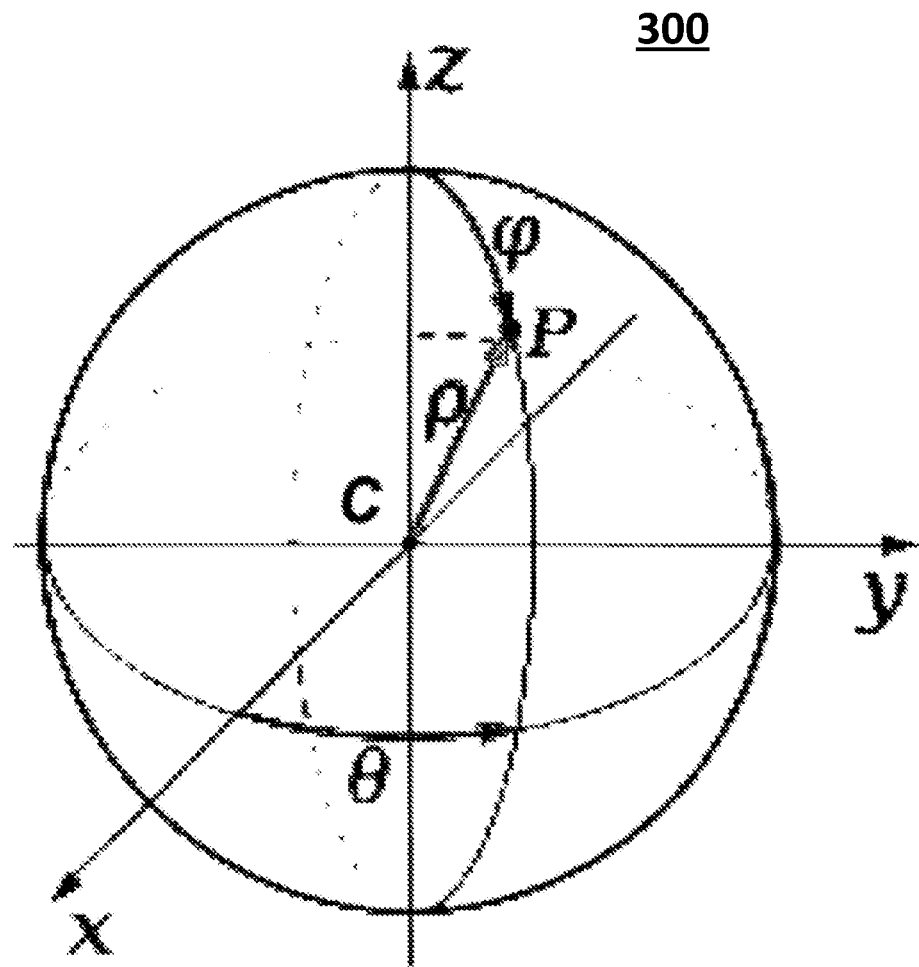
FIG. 3 illustrates a three dimensional (3D) representation a sphere.

FIG. 3 illustrates a sphere having a center C on an x-y-z axis, with a circumference P and radius ρ. The spherical image or frame of spherical video can be projected on the surface of the sphere 300. According to example implementations, each frame in a spherical video (or a subset thereof) can be centered on C. Accordingly, any frame that is not centered on C can be considered to have moved due to camera movement. This movement can be corrected for by translating the frame determined to have moved along one or more of the x-y-z axis to the center C. Further, the each frame in a spherical video (or a subset thereof) can have the x-y-z axis pointing, for example, in the direction shown in FIG. 3. Accordingly, any frame that does not have the x-y-z axis pointing, for example, in the direction shown in FIG. 3 can be considered to have moved due to camera movement. This movement can be corrected for by rotating the sphere 300. For example, the sphere can be rotated in one or more of the directions φ and/or θ shown in FIG. 3 in order to position the image such that the x-y-z axis are pointing, for example, in the direction shown in FIG. 3. Example embodiments can include translating and rotating the spherical image or frame of spherical video in the 3D domain and/or shifting the 2D rectangular representation of the spherical image or frame of spherical video in the 2D domain.

Figure 4:
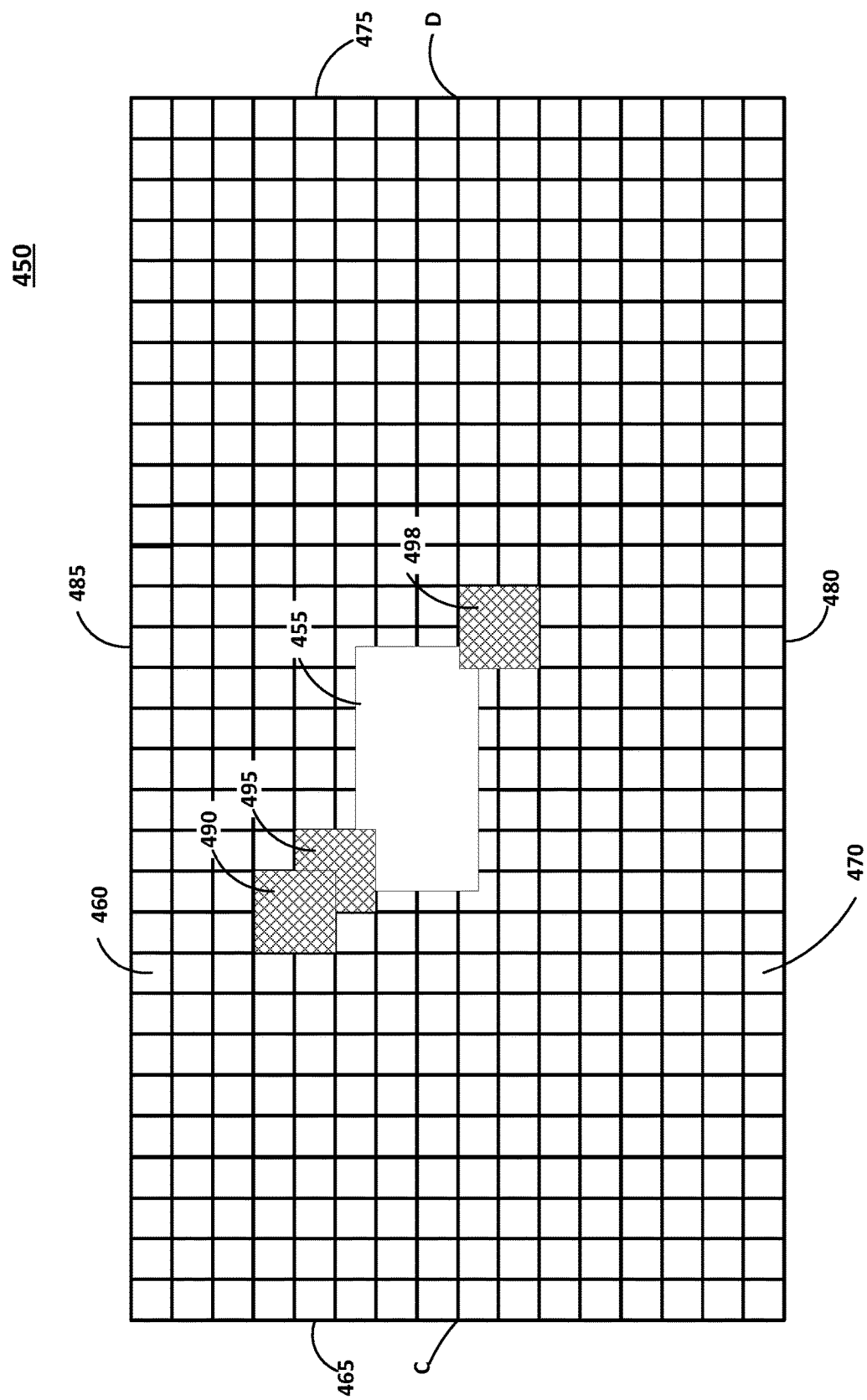
FIG. 4 illustrates an unwrapped cylindrical representation the 2D representation of a sphere as a 2D rectangular representation according to at least one example embodiment.

FIG. 4 illustrates an unwrapped cylindrical representation 450 of the 2D representation of a sphere 200 as a 2D rectangular representation. The 2D rectangular representation can be an equirectangular projection of an image decomposed as a C×R matrix of N×N blocks. For example, as shown in FIG. 4, the illustrated unwrapped cylindrical representation 450 is a 30×16 matrix of N×N blocks. However, other C×R dimensions are within the scope of this disclosure. The blocks may be 2×2, 2×4, 4×4, 4×8, 8×8, 8×16, 16×16, and the like blocks (or blocks of pixels). An equirectangular projection of an image shown as an unwrapped cylindrical representation 450 may appear as a stretched image as the image progresses vertically (up and down as shown in FIG. 4).

A spherical image is an image that is continuous in all directions. Accordingly, if the spherical image were to be decomposed into a plurality of blocks, the plurality of blocks would be contiguous over the spherical image. In other words, there are no edges or boundaries as in a 2D image. In example implementations, an adjacent end block may be adjacent to a boundary of the 2D representation. In addition, an adjacent end block may be a contiguous block to a block on a boundary of the 2D representation. For example, the adjacent end block being associated with two or more boundaries of the two dimensional representation. In other words, because a spherical image is an image that is continuous in all directions, an adjacent end can be associated with a top boundary (e.g., of a column of blocks) and a bottom boundary in an image or frame and/or associated with a left boundary (e.g., of a row of blocks) and a right boundary in an image or frame.

For example, if an equirectangular projection is used, an adjacent end block may be the block on the other end of the column or row. For example, as shown in FIG. 4 block 460 and 470 may be respective adjacent end blocks (by column) to each other. Further, block 480 and 485 may be respective adjacent end blocks (by column) to each other. Still further, block 465 and 475 may be respective adjacent end blocks (by row) to each other. A view perspective 455 may include (and/or overlap) at least one block. Blocks may be encoded as a region of the image, a region of the frame, a portion or subset of the image or frame, a group of blocks and the like. Hereinafter this group of blocks may be referred as a tile or a group of tiles. A tile may be a plurality of pixels selected based on a view perspective of a viewer during playback of the spherical video. The plurality of pixels may be a block, plurality of blocks or macro-block that can include a portion of the spherical image that can be seen by the user. For example, tiles 490 and 495 are illustrated as a group of four blocks in FIG. 4.

In an example embodiment, the tile 490 and the tile 495 may represent a same position in subsequent frames where the camera has moved. In other words, tile 490 may represent a portion of a frame in a first (or earlier in time) image captured by a camera configured to capture spherical images. Tile 495 may represent a portion of a frame in a second (or later in time) image captured by the camera. In this example implementation, tile 495 may be the same portion of the image as tile 490 just one frame later in time. A viewer of these two frames may perceive this movement as un-natural or un-realistic. The movement could also have unintended consequences (e.g., induce motion sickness in the viewer). Therefore, correcting for this movement is desired. In this case correction could involve shifting the second frame (including tile 695) up and to the left.

If the image were a 2D image instead of a 2D rectangular representation of a spherical image, there would be missing portions of the image on the bottom and right of the second frame (including tile 495). However, according to example embodiments 2D rectangular representation of a spherical image is contiguous, therefore image data can be filled in from other portions of the 2D representation.

Compensating for camera movement can be performed image by image on captured 2D images. However, 2D image compensation typically results in blank or dark pixels on one or more edge of the compensated image. As a result, stitching the 2D images together to form a spherical image can be more complicated (e.g., require a more advanced algorithm) and/or the resultant spherical image can include dark portions (e.g., portions of the spherical image can be black or include no pixel data).

According to example embodiments, compensation for camera movement can be implemented in the spherical image or frame of spherical video (e.g., as represented by spherical 200). In other words, compensation for camera movement can be implemented after the spherical image or frame of spherical video is generated or stitched together using captured 2D images. As such, the spherical image or frame of spherical video can be translated (e.g., moved along an axis) and/or rotated to a compensated position. In other words, the second frame (including tile 495) can be translated and/or rotated in the 3D domain to align tile 495 with the position of tile 490 in the first frame.

Figure 5:
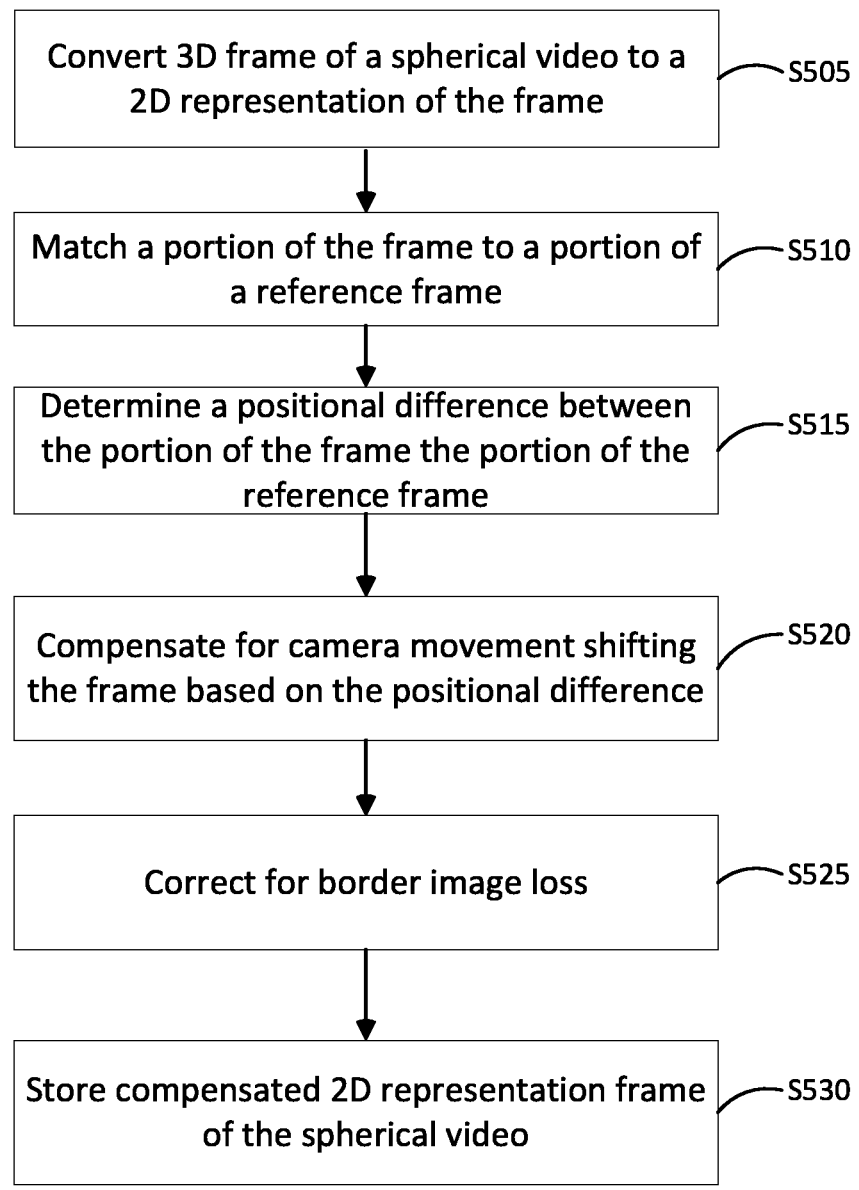
FIGS. 5, 6 and 7 illustrate methods for compensating for camera movement during image and/or video capture according to at least one example embodiment.
Figure 6:
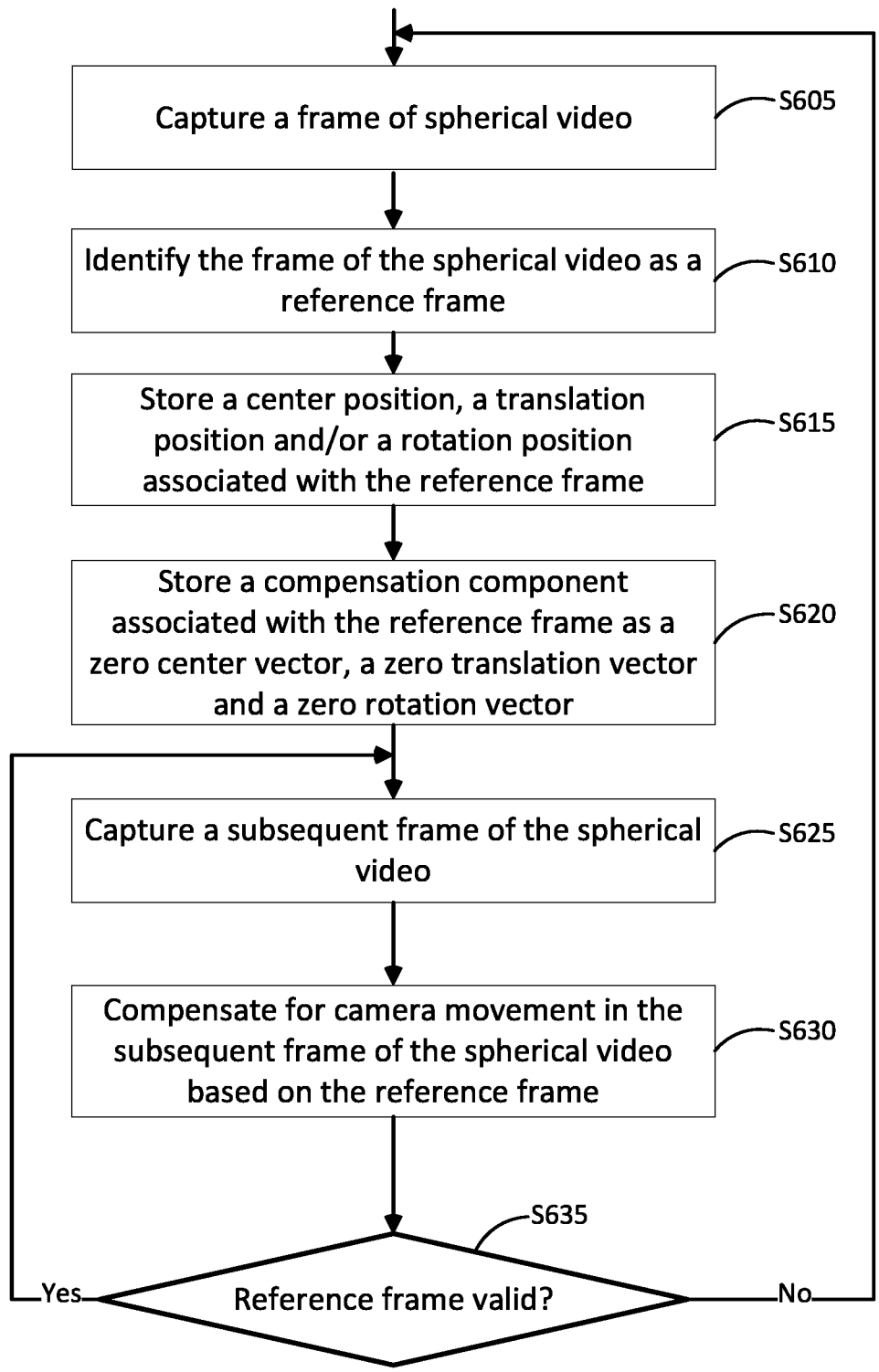
Figure 7:
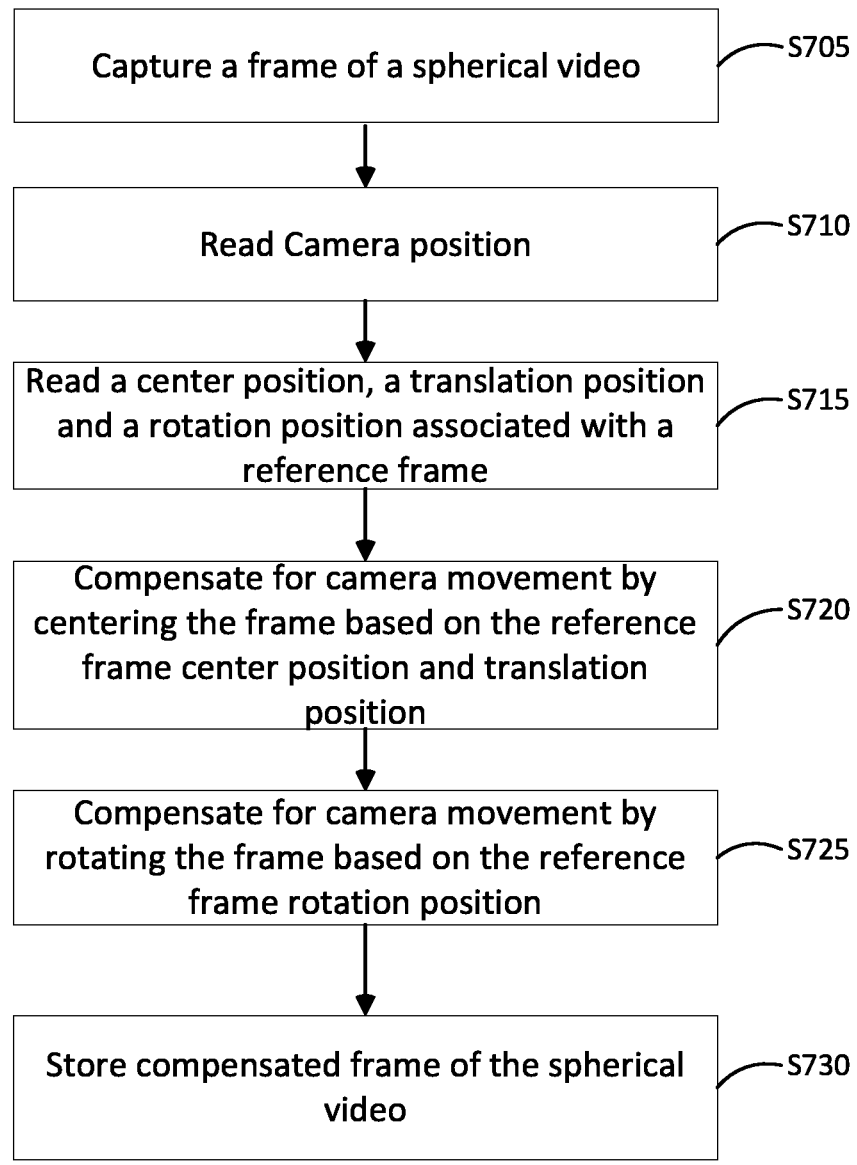

FIGS. 5, 6 and 7 are flowcharts of methods according to example embodiments. The steps described with regard to FIGS. 5, 6 and 7 may be performed due to the execution of software code stored in a memory associated with an apparatus (e.g., image processing system 106 as shown in FIG. 1) and executed by at least one processor associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIGS. 5, 6 and 7.

The steps described below with regard to FIGS. 5, 6 and 7 refer to compensating for camera movement associated with spherical video (e.g., spherical video frames). Accordingly, the spherical video frames are in spherical form. In other words, captured 2D images (e.g., by camera(s) 130 have been stitched together (e.g., by stitching module 118) to form spherical images or frames. These stitched images or frames are then stabilized (e.g., motion compensated) according to the methods described herein.

According to example embodiments, a captured frame rate or frames per second can be faster than a sample speed of an accelerometer (e.g., accelerometer 134). Accordingly, compensating for camera movement can be accomplished using captured images (or frames) that have been stitched together forming spherical images or frames. In this example embodiment, compensating for camera movement can be based on a current frame and (or as compared to) a reference frame. Accelerometer data can also be used to determine a direction of motion and/or as bias information should there be an indication (e.g., based on frame comparisons) of more than one possible direction of movement.

FIG. 5 illustrates a method for compensating for camera movement during spherical video capture according to at least one example embodiment. According to an example implementation, the camera movement can be compensated for in a 2D domain. As shown in FIG. 5, in step S505 a 3D frame of a spherical video is converted to a 2D representation of the frame. According to an example implementation, the projection module 120 can convert the frame of the spherical video to the 2D representation of the frame. For example, a spherical video frame or image may be mapped to a 2D representation of the spherical frame or image. For example, FIG. 2 illustrates the sphere 200 (e.g., as a frame or an image). The sphere 200 can be projected onto the surface of another shape (e.g., square, rectangle, cylinder and/or cube). The projection can be, for example, equirectangular or semi-equirectangular. Mapping a spherical frame or image to a 2D representation of the spherical frame or image is described in more detail above.

In step S510 a portion of the frame is matched to a portion of a reference frame. In an example implementation, the capture correction module 116 can match the portion of the frame to the portion of the reference frame. For example, a block and/or tile of the frame (as a frame to be compensated for camera movement) can be matched to a same block and/or tile (e.g., including a same image or portion of an image). Referring to FIG. 4, in an example embodiment, the tile 490 and the tile 495 may represent a same position in subsequent frames where the camera has moved. In other words, tile 490 may represent a portion of a frame in a reference frame captured by a camera configured to capture spherical video. Tile 495 may represent a portion of a frame in a frame to be compensated for camera movement as captured by the camera. In this example implementation, tile 495 may be the same portion of the frame as tile 490 in another frame captured later in time. In an example implementation, tile 498 could also be a match. In other words, multiple tiles in the reference frame could qualify as a match of the portion of the frame. In this example, accelerometer data can be used to determine a direction of motion. Then the match (or selecting the matched tile) can also be based on the direction of motion as determined based on accelerometer data.

In step S515 a positional difference between the portion of the frame the portion of the reference frame is determined. In an example implementation, the capture correction module 116 can determine the positional difference between the portion of the frame and the portion of the reference frame. For example, again referring to FIG. 4 the positional difference can be the x-y position difference between tile 490 and tile 495. In the example shown, tile 495 is one block down and one block to the right of tile 490. In an example implementation, the position difference can be determined by subtracting a pixel and/or block position (e.g., upper left corner, center, and/or the like) associated with tile 495 and the same pixel and/or block position associated with tile 490.

In step S520 camera movement is compensated for by shifting the frame based on the positional difference. In an example implementation, the capture correction module 116 can compensate (or stabilize) the camera movement. Continuing the example, compensation could involve shifting the second frame (including tile 495) up and to the left. In step S525 border image loss is corrected for. For example, as discussed above, boundaries of a spherical image are contiguous. Therefore, as shown in FIG. 4 blocks 460 and 470 can be considered as next to or adjacent to each other by row. Further, blocks 465 and 475 can be considered as next to or adjacent to each other by column. Therefore, continuing the example, in addition to shifting to the left, the column of blocks, including block 465, can be inserted as the last column on the right. Thus replacing a blank column of pixels created during the compensation shift. Similarly, in addition to shifting to the up, the row of blocks, including block 470, can be inserted as the bottom row. Thus, replacing a blank row of pixels created during the compensation shift.

Figure 8:
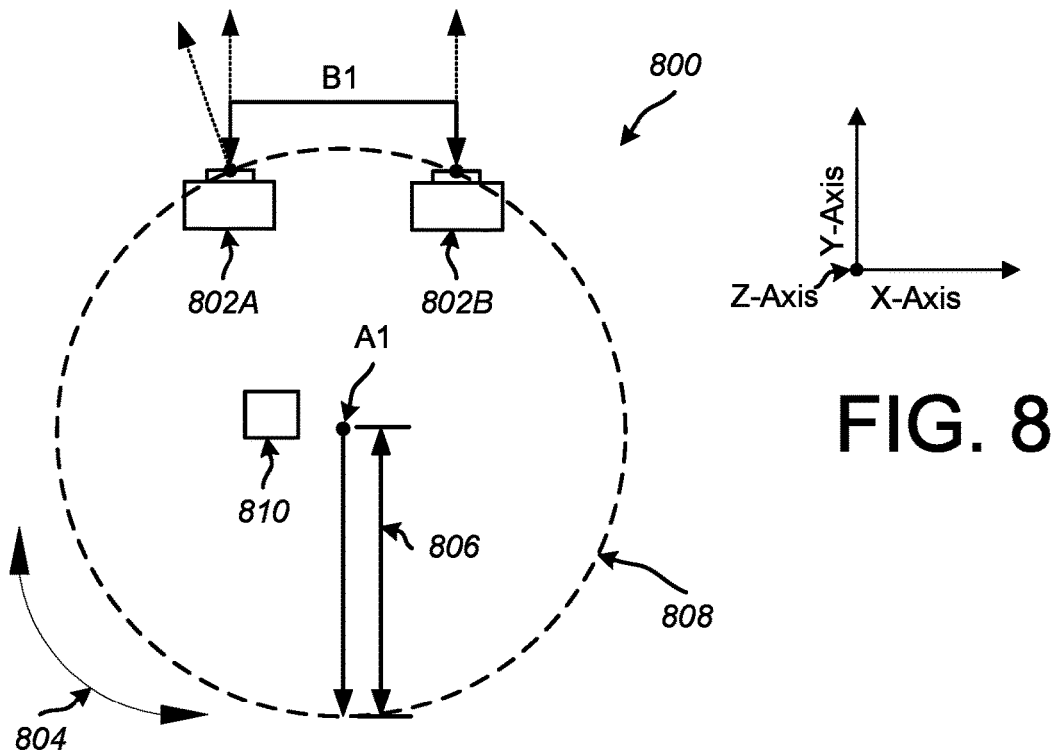
FIGS. 8, 9 and 10 illustrate diagrams depicting camera rigs according to at least one example embodiment.

In an example implementation, the spherical image may be a partial (e.g., less than a full) 3D video, video frame or image or partial spherical video, video frame or image. For example, the video or image could have been captured using a pair of cameras as illustrated in FIG. 8. In other words, video or image could have been captured using a pair of cameras that can be rotated 360 degrees around a center of rotation (e.g., like human eyes in a human head) thus capturing a panoramic scene stored as a partial 3D video or partial 3D image. In an example implementation, the partial 3D video, video frame or image or partial spherical video, video frame or image is stored as a 3D video, video frame or image or spherical video, video frame or image missing pixels or having black pixels outside of the camera's capture range. The partial 3D video, video frame or image or partial spherical video, video frame or image can also be stored with associated metadata indicating the video or image was captured as a partial 3D video, video frame or image or partial spherical video, video frame or image.

Accordingly, if the frame of the spherical video is stored as 3D video or spherical video, compensating for the camera movement can include shifting or translating using the 3D techniques as discussed above. However, if the frame of the spherical video is stored as two dimensional (2D) data, compensating for the camera movement can include shifting or translating (as discussed above) the subsequent frame in 2D based on the reference or key frame center position and the reference or key frame translation position, the method can then further include determining whether the video or image is a partial 3D video, video frame or image or partial spherical video, video frame or image (e.g., based on associated metadata). Upon determining the video or image is a partial 3D video, video frame or image or partial spherical video, video frame or image, set pixels of the movement compensated subsequent frame outside a display region (e.g., a display region of an HMD on which the video or image is to be displayed) to a default value. The display region can be based a current view perspective of a viewer during playback of the spherical video. In other words, HMD 110 (or the device configured to render images for the HMD 110) may not replace blank rows with image data if the blank rows are not to be displayed on the HMD 110.

In step S530 the compensated 2D representation frame of the spherical video is stored. For example, the compensated 2D representation frame of the spherical video can be stored in a datastore associated with a server of streaming spherical videos. The compensated 2D representation frame of the spherical video may or may not be compressed or encoded prior to being stored. The compensated frame of the spherical video can be stored in memory 124 of the image processing system 106.

FIG. 6 illustrates a method for compensating for camera movement during spherical video capture according to at least one example embodiment. As shown in FIG. 6, in step S605 a frame of spherical video is captured. For example, a camera, plurality of cameras and/or camera rig can be used to capture the frame as one of a plurality of frames that make up the spherical video. In an example implement, a camera(s) 130 of with camera rig 102 can be used to capture the frame(s). Capturing the frame of the spherical video can include storing data representing a plurality of pixels representing the frame of the spherical video. For example, data can be stored in a memory 124 of the image processing system 106.

In step S610 the frame of the spherical video is identified as a reference frame. In an example implementation, the capture correction module 116 can identify the reference frame. For example, in video compression techniques, a frame of a video can be identified as an iframe, a pframe or a key frame. The iframe, the pframe or the key frame can be used as a reference frame used in the compression (or encoding) of subsequent frames. The iframe, the pframe or the key frame can be selected on some regular time interval or based on some other criteria (e.g., likelihood subsequent frames have matching blocks). The iframe, the pframe or the key frame can also be indicated as a reference frame during compensation for camera movement. Reference frames can also be selected on a regular time interval (e.g., every 1 second), based on a position of a camera rig (e.g., the camera rig being at a predefined position), based on a user input, based on a type of image captured (e.g., an image with little or no movement versus an imaged with a significant (e.g., above a threshold amount) of movement activity), and/or the like.

In step S615 a center position, a translation position and/or a rotation position is stored in association with the reference frame. In an example implementation, the capture correction module 116 can store the center position, the translation position and/or the rotation position as metadata in a memory 124 of the image processing system 106. For example, position information can be stored as metadata associated with the reference frame. The metadata can be stored in a memory associated with the capture device (e.g., camera, camera rig and the like). The metadata can include the center position, the translation position and the rotation position associated with the capture device when the reference frame was captured. In an example implementation, the center position, the translation position and/or the rotation position can be determined using data read from or produced by an accelerometer (e.g., accelerometer 134). For example, upon capturing a frame of the spherical video using camera rig 102, accelerometer 134 can be used to capture position information of the camera rig 102 on the x-y-z axis. From this position information the center position, the translation position and/or the rotation position of the camera rig 102 can be determined. The center position, the translation position and/or the rotation position of the camera rig 102 can be stored as the center position, the translation position and/or the rotation position of the frame of the spherical video. In other words, the position information of the frame of the spherical video can be based on the position information of the capture device used to capture the frame of the spherical video.

In step S620 a compensation component associated with the reference frame is stored as an origin or zero center vector, an origin or zero translation vector and an origin or zero rotation vector. In an example implementation, the capture correction module 116 can store the origin or zero center vector, the origin or zero translation vector and the origin or zero rotation vector as metadata in a memory 124 of the image processing system 106. For example, the reference can be set as a frame of the spherical video that has no movement associated with it. Accordingly, no compensation should be applied to the reference frame. As such, metadata associated with compensation for the reference frame can indicate no movement. Therefore, metadata including a zero center vector, a zero translation vector and a zero rotation vector for the compensation component of the reference frame is associated with the reference frame and stored (e.g., in a database, a datapacket or a header associated with communicating the data for the reference frame).

In step S625 a subsequent frame of the spherical video is captured. In an example implement, a camera(s) 130 of with camera rig 102 can be used to capture the subsequent frame(s). For example, a frame of the spherical video can be captured later in time as compared to the reference frame. For example, a camera, plurality of cameras and/or camera rig can be used to capture the subsequent frame as one of a plurality of frames that make up the spherical video. Capturing the frame of the spherical video can include storing data representing a plurality of pixels representing the frame of the spherical video. In an example implementation, a center position, a translation position and a rotation position can be determined using data read from an accelerometer. For example, upon capturing a frame of the spherical video using camera rig 102, accelerometer 134 can be used to capture position information of the camera rig 102 on the x-y-z axis. From this position information the center position, the translation position and the rotation position of the camera rig 102 can be determined.

In step S630 camera movement in the subsequent frame of the spherical video is compensated for based on the reference frame. In an example implementation, the capture correction module 116 can be used to compensate for the camera movement. For example, the center position, the translation position and the rotation position associated with the subsequent frame can be compared to the center position, the translation position and the rotation position of the reference frame. Movement compensation (or stabilization) can include centering (e.g., moving the position of pixels) the subsequent frame based on a difference of the center of the subsequent frame as compared to the reference frame. Compensation can include translating by moving (e.g., moving the position of pixels) the subsequent frame along at least one of the x, y or z axis (e.g., x and y axes) based on a difference of the position of the subsequent frame as compared to the reference frame. In an example implementation, compensating for center and translations of the subsequent frame can be a single step. Movement compensation (or stabilization) can include rotating (e.g., moving the position of pixels) the subsequent frame based on a difference of the rotation position of the subsequent frame as compared to the reference frame. Rotating can include, for example, moving the pixels of the frame of the spherical video in one or more of the directions (and/or opposite to directions) y and/or 0 shown in FIG. 3.

In step S635 whether or not the reference frame valid is determined. In an example implementation, the image processing system 106 can determine whether or not the reference frame is valid. For example, as discussed above, the iframe, the pframe or the key frame (as part of a compression process) can be indicated as invalid or indicated for replacement. The regular time interval (e.g., every 1 second) could expire, the position of the camera rig could be at the position new reference frame position (e.g., the camera rig at rest), a user input could be received, the last image captured could include little or no movement, and/or the like could cause an indication to acquire a new reference frame. If the reference frame is invalid processing returns to step S605. Otherwise, processing returns to step S625.

FIG. 7 illustrates another method for compensating for camera movement during spherical video capture according to at least one example embodiment. According to an example implementation, the camera movement can be compensated for in a 3D domain. As shown in FIG. 7, in step S705 a frame of a spherical video is captured. For example, a camera, plurality of cameras and/or camera rig can be used to capture the frame as one of a plurality of frames that make up the spherical video. Capturing the frame of the spherical video can include storing data representing a plurality of pixels representing the frame of the spherical video. In an example implement, a camera(s) 130 of with camera rig 102 can be used to capture the frame(s) and stored in a memory 124 of the image processing system 106.

In step S710 a camera position is read or determined (e.g., calculated). For example, position information can be read as from an accelerometer and associated with the frame of a spherical video. The metadata can be stored in a memory associated with the capture device (e.g., camera, camera rig and the like). The metadata can include an x-position (on an x-axis), a y-position (on a y-axis) and a z-position (on a z-axis) of the capture device. The metadata can also include at least one rotation angle associated with the capture device. For example, upon capturing a frame of the spherical video using camera rig 102, accelerometer 134 can be used to capture position information of the camera rig 102 on the x-y-z axis. From the position information or metadata the center position, the translation position and the rotation position of the camera rig 102 can be determined. The center position, the translation position and the rotation position of the camera rig 102 can be stored as the center position, the translation position and the rotation position of the frame of the spherical video. In other words, the position information of the frame of the spherical video can be based on the position information of the capture device used to capture the frame of the spherical video.

In step S715 a center position, a translation position and a rotation position associated with a reference frame is read or retrieved (e.g., processed). For example, the center position, the translation position and the rotation position can be stored (e.g., in memory 124 of the image processing system 106) in association with a reference frame. In an example implementation, position information can be stored as metadata associated with the reference frame. The metadata can also be stored in a memory associated with the capture device (e.g., camera, camera rig and the like). The metadata can include the center position, the translation position and the rotation position associated with the capture device when the reference frame was captured. Accordingly, the center position, the translation position and the rotation position can be read from memory 124 of the image processing system 106.

In step S720 camera movement can be compensated for by centering the frame based on the reference frame center position and translation position. In an example implementation, the capture correction module 116 can compensate for movement or stabilize the image or frame. For example, the center position of the captured frame and the translation position of the captured frame can be compared to the center position of the captured frame and the translation position of the captured frame. In an example implementation, the center position of the captured frame can be subtracted from the center position of the reference position and the translation position of the captured frame can be subtracted from the translation position of the reference frame. The frame can be moved (e.g., moving the position of pixels) based on a determined or calculated difference. Referring to FIG. 3, the moving can be illustrated as moving the position of center C associated with the frame to the position of center C associated with the reference frame. With the movement of center C, all of the associated pixels of the frame move or translate (e.g., in the same direction and by the same amount) with center C. The movement or translation can be a vector movement (e.g., one movement considering each of the x-y-z axis) or individual axis movement or translation (e.g., move or translate along the x-axis, then move or translate along the y-axis, and finally move or translate along the x-axis (not necessarily in that order)).

In step S725 camera movement can be compensated for by rotating the frame based on the reference frame rotation position. In an example implementation, the capture correction module 116 can compensate for movement or stabilize the image or frame. For example, an angular position (e.g., a pole) of the captured frame can be compared the same angular position of the captured frame. In an example implementation, the angular position of the captured frame can be subtracted from the angular position of the reference position. The captured frame can be rotated (e.g., moving the position of pixels) based on a determined or calculated difference. Referring to FIG. 3, the moving can be illustrated as rotating around the position of center C associated with the captured frame in one or more of the directions φ and/or θ. With the rotation around the center C, all of the associated pixels of the frame rotate (e.g., in the same direction and by the same amount) around the center C. The rotation can be a combined movement (e.g., one movement considering each of φ and/or θ) or individual rotation (e.g., rotation in, or opposite to, φ, then rotation in, or opposite to, θ (not necessarily in that order)).

In step S730 the compensated frame of the spherical video is stored. For example, the compensated frame of the spherical video can be stored in a datastore associated with a server of streaming spherical videos. The compensated frame of the spherical video may or may not be compressed or encoded prior to being stored. The compensated frame of the spherical video can be stored in memory 124 of the image processing system 106.

In an example implementation, the steps described with regard to FIGS. 5 and 7 can be performed in sequence as, for example, step S630 of FIG. 6. In this example implementation, the steps of FIG. 7 can compensate for camera movement and the steps of FIG. 5 (or a portion thereof) can compensate for accelerometer measurement error. For example, the steps of FIG. 7 can compensate for a majority of the camera movement and the steps of FIG. 5 can fine tune the compensation. Accordingly, in an example implementation the steps of FIG. 5 can be optionally performed in combination with the steps of FIG. 7. Further, the results of FIG. 5 (e.g., the positional difference) could be used as feedback to calibrate or adjust accelerometer measurements or as an offset for use by the method of FIG. 7. In other words, the center position, the translation position and/or the rotation position of FIG. 7 could be offset based on the positional difference calculated or determined in FIG. 5.

FIG. 8 is a diagram depicting an example camera rig 800 configured to capture images of a scene for use in generating 3D images and/or video. The camera rig 800 includes a first camera 802A, a second camera 802b (each affixed to a ring-shaped support base (not shown)) and an accelerometer 810. As shown, cameras 802A and 802B are disposed in an annular location facing directly outward (toward images/scenes to be capture) and parallel to a center or axis of rotation (A1) of the camera rig 800.

In the illustrated example, the cameras 802A and 802B are disposed (e.g., placed) on a mount plate 808 at a distance apart (B1). In some implementations, the distance (B1) between each camera on the camera rig 800 may represent an average human interpupillary distance (IPD). Placing the cameras at IPD distance apart can approximate how human eyes would view images as they rotate (left or right as shown by arrow 804) to scan a scene around a capture path indicated by arrow 804. Example average human IPD measurements can be about 5 centimeters to about 6.5 centimeters. In some implementations, each camera disposed at standard IPD distance apart can be part of a stereo pair of cameras.

In some implementations, the camera rig 800 can be configured to approximate a diameter of a human head. For example, the camera rig 800 can be designed with a diameter 806 of about 8 centimeters to about 10 centimeters. This diameter 806 can be selected for the rig 800 to approximate how a human head would rotate and view scene images with human eyes with respect to center of rotation A1. Other measurements are possible and the rig 800 or system 800 can adjust the capture techniques and the resulting images if, for example, a larger diameter were to be used.

As shown in FIG. 8, two cameras 802A, 802B can be configured with a wide field of view. For example, the cameras can capture a field of view of about 150 degrees to about 180 degrees. The cameras 802A, 802B may have fish-eye lens to capture wider views. In some implementations, cameras 802A, 802B function as a stereo pair. In operation, the camera rig 800 can be rotated 360 degrees around the center of rotation A1 to capture a panoramic scene. Alternatively, the camera rig 800 can remain stationary and additional cameras can be added to the camera rig 800 to capture additional portions of the 360-degree scene (as shown in FIG. 9).

As shown in FIG. 8, the camera rig 800 can include an accelerometer 810. Although not shown, in at least one example implementation camera rig 800 can include a plurality of accelerometers 810. The accelerometer can be configured to generate a signal based on acceleration in the x-direction, a signal based on acceleration in the y-direction and/or a signal based on acceleration in the z-direction. In other words, the accelerometer 810 can be configured to generate at least one signal including translational information associated with the camera rig 800. Further, the accelerometer 810 can be configured to generate a signal based on acceleration in a combination of the x-direction, the y-direction and/or the z-direction. In other words, the accelerometer 810 can be configured to generate at least one signal including rotational and or translational information associated with the camera rig 800. Accordingly, the camera rig 800 can be configured to capture images (e.g., 3D images) and/or video (e.g., spherical video) as well as generate signals associated with movement of the camera rig 800 while the camera rig 800 is capturing the images and/or video.

Figure 9:
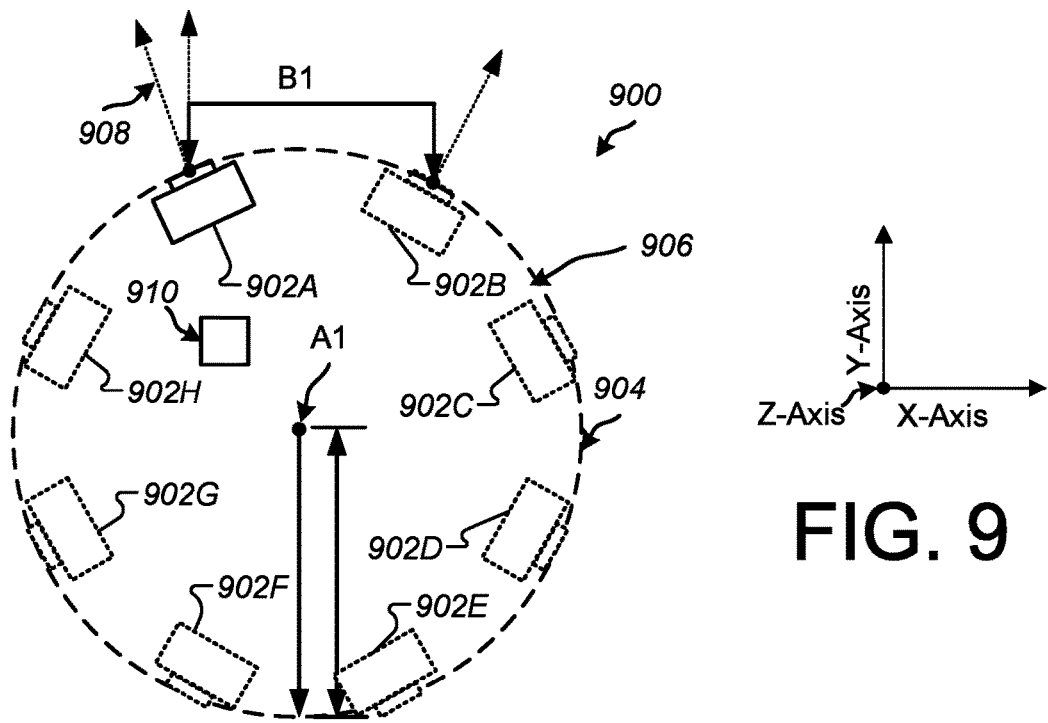

FIG. 9 is a diagram depicting another example camera rig 900 configured to capture images of a scene for use in generating stereoscopic panoramas. The camera rig 900 includes a number of cameras 902A-902H affixed to a ring-shaped support base (not shown) and an accelerometer 910. The first camera 902A is shown as a solid line and the additional cameras 902B-902H are shown with broken lines to indicate that they may be included in some embodiments or excluded in some embodiments. In contrast to the parallel mounted cameras shown in camera rig 800 (see cameras 802A and 802B), the cameras 902A-902H are disposed tangentially to the outer circumference of the circular camera rig 900.

In the depicted example, the cameras 802A and 802B are disposed at a specific distance apart (B1), similar to the cameras in rig 800. In this example, cameras 902A and 902B can function as a stereo pair to capture angles off of a center camera lens to a leftward and rightward direction, respectively, as described in detail below.

In one example, the camera rig 900 is circular rig that includes a rotatable base (not shown) and a mount plate 906 and the stereo pair of cameras includes a first camera 902A, placed on the mount plate 906, and configured to point in a viewing direction that is tangential to an edge of the mount plate 906 and arranged to point toward a leftward direction, and a second camera 902B, placed on the mount plate 906 in a side-by-side fashion to the first camera and placed at an interpupillary distance from the first camera 902A, the second camera 902B arranged to point in a viewing direction that is tangential to an edge of the mount plate 906 and arranged to point toward a rightward direction. Similarly, stereo pairs can be made from cameras 902C and 902D, another pair from cameras 902E and 902F, and yet another pair from cameras 902G and 902H. In some implementations, each camera (e.g., 902A) can be paired with a camera that is not adjacent to itself, but is adjacent to its neighbor, such that each camera on the rig can be paired to another camera on the rig. In some implementations, each camera can be paired with its direct neighbor.

In some implementations, one or more stereo pairs can be generated by the interpolation module 914. For example, in addition to the stereo pairs shown on camera rig 900, additional stereo pairs can be generated as synthetic stereo image pairs. In particular, analyzing rays from captured images (e.g., ray tracing) can produce simulated frames of a 3D scene. The analysis can include tracing rays backward from a viewpoint through a particular image or image frame and into the scene. If a particular ray strikes an object in the scene, each image pixel through which it passes can be painted with a color to match the object. If the ray does not strike the object, the image pixel can be painted with a color matching a background or other feature in the scene. Using the viewpoints and ray tracing, the interpolation module 914 can generate additional scene content that appears to be from a simulated stereo pair. The additional content can include image effects, missing image content, background content, content for outside the field of view.

As shown in FIG. 9, the cameras 902A-902H are disposed (e.g., placed) tangentially (or substantially tangentially) to the outer circumference of camera rig 900, and as such, can capture up to a 180 degree view of a scene. That is, since the cameras are placed in a tangential manner, a fully un-occluded, 180-degree field of view can be captured in each camera on the rig.

In some implementations, the camera rig 900 includes a stereo pair of cameras. For example, the rig 900 can include stereo camera pair 902A and 902B. Camera 902A can be configured with an associated lens directed in a viewing direction that is tangential to an edge of a mount plate 904 and arranged to point toward a leftward direction. Similarly, camera 902B can be disposed on the mount plate 904 in a side-by-side fashion to camera 902A and placed at approximate human interpupillary distance from camera 902A and arranged to point in a viewing direction that is tangential to an edge of the mount plate 904 and arranged to point toward a rightward direction.

In some implementations, particular sensors on cameras 902A-H (or on camera rig 900) may be disposed tangentially to the outer circumference of the cameras 902A-H (or the rig 900), rather than the having the actual cameras 902A-H disposed tangentially. In this manner, the cameras 902A-H can be placed according to a user preference and the sensors can detect which camera or cameras 902A-H can capture images based on rig 900 location, sweeping speed, or based on camera configurations and settings.

In some implementations, the stereo pair can include camera 902A and camera 902E arranged in a back-to-back or side-by-side fashion. This arrangement can also be used to gather viewing angles to the left and right of an azimuth 908 formed by the respective camera lens and the mount plate 904. In some implementations, the cameras are arranged at a tilted angle to the left and right of the azimuth 908 formed by the camera lens and the mount plate 904, respectively.

In some implementations, cameras placed on camera rig 900 can be non-paired and simply aligned around the circular rig in an outward facing direction. In some implementations, the rig 900 includes a single camera (e.g., camera 902A). In the event that only camera 902A is mounted to rig 900, stereo panoramic images can be captured by rotating the camera rig 900 a full 360 degrees clockwise and then repeating the rotation in a counterclockwise motion.

As shown in FIG. 9, the camera rig 900 can include an accelerometer 910. Although not shown, in at least one example implementation camera rig 900 can include a plurality of accelerometers 910. The accelerometer 910 can be configured to generate a signal based on acceleration in the x-direction, a signal based on acceleration in the y-direction and/or a signal based on acceleration in the z-direction. In other words, the accelerometer 910 can be configured to generate at least one signal including translational information associated with the camera rig 900. Further, the accelerometer 910 can be configured to generate a signal based on acceleration in a combination of the x-direction, the y-direction and the z-direction. In other words, the accelerometer 910 can be configured to generate at least one signal including rotational and or translational information associated with the camera rig 900. Accordingly, the camera rig 900 can be configured to capture images (e.g., 3D images) and/or video (e.g., spherical video) as well as generate signals associated with movement of the camera rig 900 while the camera rig 900 is capturing the images and/or video.

Figure 10:
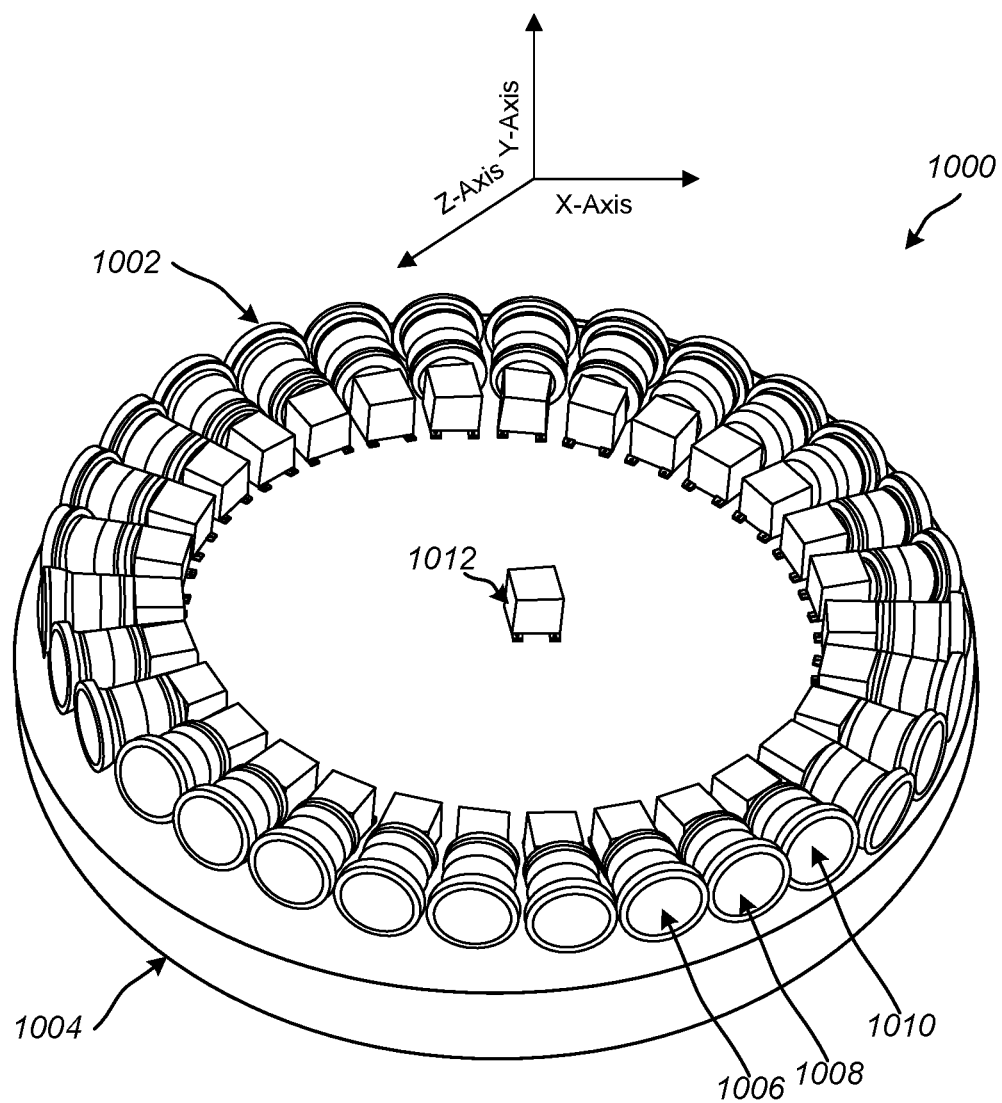

FIG. 10 is a diagram depicting another example camera rig 1000 configured to capture images of a scene for use in generating stereoscopic panoramas. The camera rig 1000 can be mounted on a mount plate 1002. The mount plate 1002 can be seated on a rotatable base 1004. The camera rig 1000 includes a number of side-by side cameras (e.g., cameras 1006-1010) that fill the circumference area of a mount plate 1002 of the camera rig. The cameras can be placed to fill the circumference of the rig 1000 or alternatively, can be strategically spaced to maximize viewing angles and minimize capturing portions of the rig itself.

In an example implementation, the circular camera rig 1000 can capture a set of images, using any number of cameras disposed on the mount plate 1002, by rotating in an arcing motion parallel to the rotatable base 1004. In some implementations, the camera rig 1000 includes at a stereo pair of cameras disposed on the mount plate 1002. The stereo pair may be synchronized configured, and positioned to capture a field of view associated of about 160 degrees to about 180 degrees. Other fields of view are possible. In some implementations, the camera rig 1000 is not mounted on a rotatable base and functions in a stationary manner.

In one example of rig operation, the camera rig (e.g., rig 800, 900 or 1000) can be rotated in a first direction during capture of a scene surround the particular rig and subsequently rotated in a different direction during capture of the scene. For example, the camera rig 1000 can be rotated clockwise while one or more of the cameras (or stereo pairs) on the rig 1000 are placed with a viewing direction that is offset at opposite sides of a center of the base 1004 of the camera rig 1000. In a similar fashion, the camera rig 1000 can then be rotated in a counterclockwise direction with any number of the cameras facing leftward or rightward to capture additional views of the scene. In one example orientation of rig 1000, every other camera can be oriented in one direction (e.g., camera lens angled leftward or rightward) while the cameras in between are oriented in an opposite (e.g., leftward facing or rightward facing) direction.

In some implementations, the base 1004 can be fixed. For example, each camera on rig 1000 may be any still camera or a video camera that functions in a still mode. Accordingly, the cameras can be synchronized and/or configured to simultaneously capture image frames of a surrounding scene. The aspects can be stitched together to form a stereo panoramic view.

In some implementations, the camera rigs described in this disclosure can include any number of cameras mounted on a circular housing. In some implementations, cameras can be mounted equidistant with a pair of cameras on each of four directions outward from the center of the circular rig. In this example, the cameras, configured as stereoscopic pairs, for example, can be aimed outward along a circumference and disposed in a zero degree, ninety degree, one-hundred eighty degree, and two hundred seventy degree fashion so that each stereoscopic pair captures a separate quadrant of a 360-degree field of view. In general, the selectable field of view of the cameras determines the amount of overlap of camera view of a stereoscopic pair, as well as the size of any blind spots between cameras and between adjacent quadrants. One example camera rig can employ one or more stereoscopic camera pairs configured to capture a field of about 120 degrees up to about 180 degrees.

In some implementations, the camera rigs described in this disclosure can be configured with a diameter (e.g., diameter 806 in FIG. 8) to mimic human interpupillary distances to capture what a user would see if, for example, the user were to turn her head or body in a quarter circle, half circle, full circle, or other portion of a circle. In some implementations, the diameter can refer to a distance across the rig from camera lens to camera lens. In some implementations, the diameter can refer to a distance from one camera sensor across the rig to another camera sensor. In some implementations, the diameter may simply refer to the size of the mount plate (e.g., mount plate 808) from edge to edge across the ring-shaped plate.

In some implementations, the camera rig is scaled up to, for example, house additional camera fixtures. In some implementations, fewer cameras can be used on a smaller diameter rig. In such an example, the systems described in this disclosure can ascertain or deduce views between the cameras on the rig and interleave such views with the actual captured views.

In some implementations, the camera rigs described in this disclosure can be used to capture a panoramic image by capturing an entire panorama in a single exposure by using a camera with a rotating lens, or a rotating camera, for example. The cameras and camera rigs described above can be used with the methods described in this disclosure. In particular, a method described with respect to one camera rig can be performed using any of the other camera rigs described herein. In some implementations, the camera rigs and subsequent captured content can be combined with other content, such as virtual content, rendered computer graphics (CG) content, and/or other obtained or generated images.

In some implementations, camera rig 1000 can include any number of cameras that can be fit onto the rig. In one example implementation, the rig 1000 can include at least three cameras functioning together to capture images that can be used to calculate depths for purposes of generating 3D stereoscopic imagery (e.g., spherical images and/or frames of a spherical video). For example, base 1004 can include a first camera 1006, placed on the base 1004 of the camera rig 1000. The first camera 1006 can be configured to point in an outward viewing direction that is tangential to an edge of the base 1004 and arranged to capture images at a distance from an outward edge of the base 1004.

Similarly, a second camera 1008 can be placed on the base in a side-by-side fashion to the first camera 1006 and can be configured to point in a viewing direction that is tangential to the edge of the base 1004 and arranged to capture images at a distance from the outward edge of the base 1004. Similarly, a third camera 1010 can be placed on the base 1004 in a side-by-side fashion to the second camera 1008 or alternatively in a side-by-side fashion to the first camera. The third camera 1010 can be configured to point in a viewing direction that is tangential to the edge of the base 1004 and arranged to capture images at a distance from the outward edge of the base 1004.

In general, images captured using at least three cameras (e.g., cameras 1006, 1008 1010) on camera rig 1000 can be used to calculate depth measurements for a particular scene. The depth measurements can be used to translate portions of the scene (or images from the scene) into 3D stereoscopic content (e.g., spherical images and/or frames of a spherical video). For example, the interpolation module 914 can use the depth measurements to produce 3D stereoscopic content that can be stitched into 360 degree stereo video imagery (e.g., spherical images and/or frames of a spherical video).

As shown in FIG. 10, the camera rig 1000 can include an accelerometer 1012. Although not shown, in at least one example implementation camera rig 1000 can include a plurality of accelerometers 1012. The accelerometer can be configured to generate a signal based on acceleration in the x-direction, a signal based on acceleration in the y-direction and/or a signal based on acceleration in the z-direction. In other words, the accelerometer 1012 can be configured to generate at least one signal including translational information associated with the camera rig 1000. Further, the accelerometer 1012 can be configured to generate a signal based on acceleration in a combination of the x-direction, the y-direction and the z-direction. In other words, the accelerometer 1012 can be configured to generate at least one signal including rotational and/or translational information associated with the camera rig 1000. Accordingly, the camera rig 1000 can be configured to capture images (e.g., 3D images) and/or video (e.g., spherical video) as well as generate signals associated with movement of the camera rig 1000 while the camera rig 1000 is capturing the images and/or video.

Figure 11:
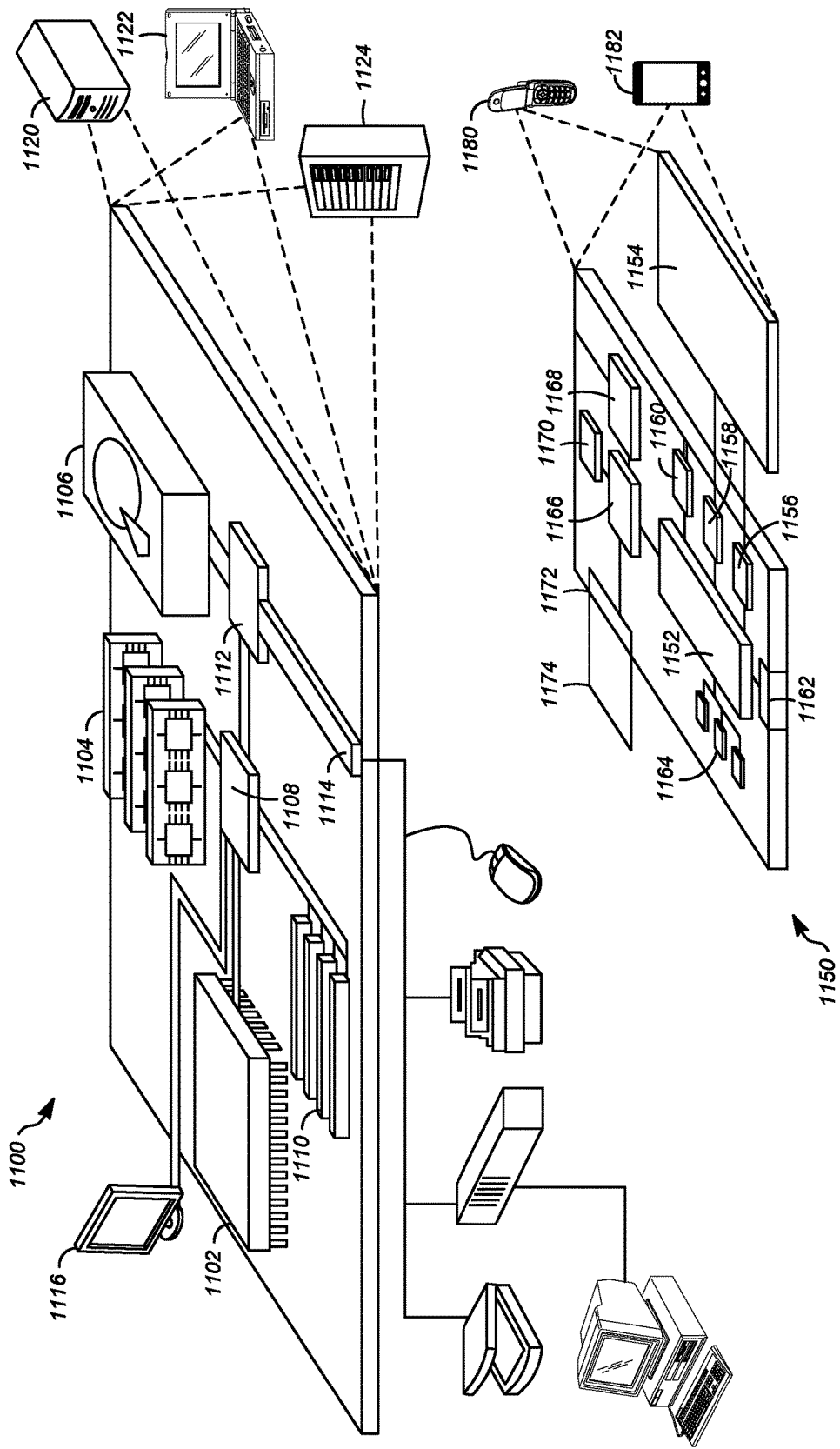
FIG. 11 illustrates an example of a computer device and a mobile computer device.

FIG. 11 shows an example of a computer device 1100 and a mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    identifying a frame of a spherical video as a key frame;
    storing a compensation component based on position data of a camera in association with the key frame;
    compensating for a movement of the camera in a subsequent frame of the spherical video based on the key frame and the compensation component associated with the key frame; and
    in response to determining the spherical video was captured as partial spherical data, set a pixel of the movement compensated subsequent frame outside a display region to a default value.

2. The method of claim 1, further comprising:
    capturing accelerometer data for the camera with each captured frame of the spherical video;
    using the accelerometer data to generate at least one of a center position, a translation position and a rotation position associated with the key frame; and
    storing the at least one of the center position, the translation position and the rotation position associated with the key frame, wherein the compensation component is based on the at least one of the center position, the translation position and the rotation position.

3. The method of claim 1, further comprising:
    matching a portion of the subsequent frame to a plurality of portions of the key frame;
    selecting one of the plurality of portions of the key frame for use in the compensating for the movement of the camera based on a direction of the compensation component; and
    compensating for the movement of the camera in the subsequent frame using the selected one of the plurality of portions of the key frame.

4. The method of claim 1, wherein
the key frame is one of a plurality of key frames, and
the compensation component associated with the key frame is further based on a previous key frame of the plurality of key frames.

5. The method of claim 1, wherein the compensating for the camera movement is performed by one of a camera, a server configured to stream the spherical video and a device configured to render the spherical video.

6. The method of claim 1, wherein
the compensation component includes a center position and a translation position associated with the key frame, and
the compensating for the camera movement includes centering the subsequent frame based on the key frame center position and the key frame translation position.

7. The method of claim 1, wherein
the subsequent frame of the spherical video is stored as three dimensional (3D) data,
the compensation component includes a center position and a translation position associated with the key frame, and
the compensating for the camera movement includes rotating the subsequent frame in 3D based on the key frame center position and the key frame translation position.

8. The method of claim 1, wherein
the subsequent frame of the spherical video is stored as two dimensional (2D) data,
the compensation component includes a center position and a translation position associated with the key frame, and
the compensating for the camera movement includes shifting the subsequent frame in 2D based on the key frame center position and the key frame translation position, the method further comprising:
correcting for border image loss.

9. The method of claim 1, wherein
the subsequent frame of the spherical video is stored as two dimensional (2D) data,
the compensation component includes a center position and a translation position associated with the key frame,
the compensating for the camera movement includes shifting the subsequent frame in 2D based on the key frame center position and the key frame translation position;
upon determining the spherical video was not captured as partial spherical data, correcting for border image loss.

10. A device comprising;
a processor;
a memory configured to store instructions that when executed by the processor cause the device to:
identify a frame of a spherical video as a key frame;
store a compensation component based on position data in association with the key frame;
compensate for a camera movement in a subsequent frame of the spherical video based on the key frame and the compensation component associated with the key frame; and
in response to determining the spherical video was captured as partial spherical data, set pixels of the movement compensated subsequent frame outside a display region of the device to a default value.

11. The device of claim 10, wherein the device is one of a camera, a server configured to stream the spherical video and a device configured to render the spherical video.

12. The device of claim 10, wherein the instructions further cause the processor to:
capture accelerometer data for the camera with each captured frame of the spherical video; and
use the accelerometer data to generate at least one of a center position, a translation position and a rotation position associated with the key frame; and
store the at least one of the center position, the translation position and the rotation position associated with the key frame, wherein the compensation component is based on the at least one of the center position, the translation position and the rotation position.

13. The device of claim 10, wherein the instructions further cause the processor to:
match a portion of the subsequent frame to a plurality of portions of the key frame;
select one of the plurality of portions of the key frame for use in the compensating for the movement of the camera based on a direction of the compensation component, and
compensate for the movement of the camera in the subsequent frame using the selected one of the plurality of portions of the key frame.

14. The device of claim 10, wherein
the key frame is one of a plurality of key frames, and
the compensation component associated with the key frame is further based on a previous key frame of the plurality of key frames.

15. The device of claim 10, wherein
the compensation component includes a center position and a translation position associated with the key frame, and
the compensating for the camera movement includes centering the subsequent frame based on the key frame center position and the key frame translation position.

16. The device of claim 10, wherein
subsequent frame of the spherical video is stored as three dimensional (3D) data,
the compensation component includes a center position and a translation position associated with the key frame, and
the compensating for the camera movement includes rotating the subsequent frame in 3D based on the key frame center position and the key frame translation position.

17. The device of claim 10, wherein
subsequent frame of the spherical video is stored as two dimensional (2D) data,
the compensation component includes a center position and a translation position associated with the key frame, and
the compensating for the camera movement includes shifting the subsequent frame in 2D based on the key frame center position and the key frame translation position, the method further comprising:
correcting for border image loss.

18. The device of claim 10, wherein
the subsequent frame of the spherical video is stored as two dimensional (2D) data,
the compensation component includes a center position and a translation position associated with the key frame, the compensating for the camera movement includes shifting the subsequent frame in 2D based on the key frame center position and the key frame translation position, and upon determining the spherical video was not captured as partial spherical data, correcting for border image loss.

19. A non-transitory computer readable medium having code segments stored thereon, the code segments, when executed by a processor cause the processor to:

identify a frame of a spherical video as a key frame;

store a compensation component based on position data in association with the key frame;

compensate for a camera movement in a subsequent frame of the spherical video based on the key frame and the compensation component associated with the key frame; and in response to determining the spherical video was not captured as partial spherical data, correcting for border image loss.

20. The non-transitory computer readable medium of claim 19, wherein the subsequent frame of the spherical video is stored as two dimensional (2D) data, the compensation component includes a center position and a translation position associated with the key frame, the compensating for the camera movement includes shifting the subsequent frame in 2D based on the key frame center position and the key frame translation position, upon determining the spherical video was captured as partial spherical data, set pixels of the movement compensated subsequent frame outside a display region to a default value.

* * * * *